US010411945B2

(12) United States Patent
Liu et al.

(10) Patent No.: US 10,411,945 B2
(45) Date of Patent: Sep. 10, 2019

(54) TIME-DISTRIBUTED AND REAL-TIME PROCESSING IN INFORMATION RECOMMENDATION SYSTEM, METHOD AND APPARATUS

(71) Applicant: Tencent Technology (Shenzhen) Company Limited, Shenzhen, Guangdong (CN)

(72) Inventors: Dapeng Liu, Guangdong (CN); Lei Xiao, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 140 days.

(21) Appl. No.: 15/644,177

(22) Filed: Jul. 7, 2017

(65) Prior Publication Data

US 2017/0310533 A1 Oct. 26, 2017

Related U.S. Application Data

(63) Continuation of application No. PCT/CN2016/081031, filed on May 4, 2016.

(30) Foreign Application Priority Data

Jun. 9, 2015 (CN) .......................... 2015 1 0312870

(51) Int. Cl.
*G06F 15/16* (2006.01)
*H04L 29/08* (2006.01)
(Continued)

(52) U.S. Cl.
CPC ............. *H04L 29/08* (2013.01); *G06F 16/00* (2019.01); *H04L 51/00* (2013.01); *H04L 51/10* (2013.01);
(Continued)

(58) Field of Classification Search
CPC ................................ H04W 4/21; H04L 67/22
(Continued)

(56) References Cited

U.S. PATENT DOCUMENTS

2011/0066507 A1 3/2011 Iyer et al.
2012/0158455 A1* 6/2012 Pathak ............... G06Q 30/0201
705/7.29

(Continued)

FOREIGN PATENT DOCUMENTS

CN 102880691 A 1/2013
CN 103166930 A 6/2013
(Continued)

OTHER PUBLICATIONS

International Preliminary Report on Patentability dated Dec. 12, 2017 for PCT Application No. PCT/CN2016/081031 (6 pp.).
(Continued)

*Primary Examiner* — Hee Soo Kim
(74) *Attorney, Agent, or Firm* — Brinks Gilson & Lione

(57) ABSTRACT

The present invention discloses a real-time and time-distributed information recommendation system, method and apparatus. Specifically, when first clients of the information recommendation system running on first terminal devices access and operate on pieces of information, influence values of the pieces of information on friend clients of the first clients are calculated, accumulated and recorded in a database based on fried intimacy and types of the operations at the times the pieces of information are accessed and operated on. As such, the influence values of the pieces of information on friend clients are updated over time and in real-time. The speed and efficiency of processes for recommending information to the friend clients, when requested, are thus improved.

20 Claims, 13 Drawing Sheets

(51) Int. Cl.
*H04L 12/58* (2006.01)
*H04W 4/21* (2018.01)
*G06F 16/00* (2019.01)

(52) U.S. Cl.
CPC .............. *H04L 51/32* (2013.01); *H04L 67/22* (2013.01); *H04L 67/26* (2013.01); *H04L 67/306* (2013.01); *H04W 4/21* (2018.02)

(58) Field of Classification Search
USPC ......................................................... 709/203
See application file for complete search history.

(56) References Cited

U.S. PATENT DOCUMENTS

| | | | | |
|---|---|---|---|---|
| 2013/0254283 | A1* | 9/2013 | Garcia-Martinez | G06Q 50/01 709/204 |
| 2014/0136521 | A1* | 5/2014 | Pappas | G06Q 50/01 707/722 |
| 2014/0152666 | A1 | 6/2014 | Deng et al. | |
| 2014/0337436 | A1* | 11/2014 | Hoagland | H04L 51/16 709/204 |
| 2015/0012449 | A1* | 1/2015 | Jackson | H04L 67/02 705/319 |
| 2015/0046217 | A1* | 2/2015 | Desmond | G06Q 30/0202 705/7.31 |
| 2015/0213022 | A1* | 7/2015 | Agarwal | G06F 16/24578 707/731 |
| 2015/0347593 | A1* | 12/2015 | Tsai | G06F 16/9535 707/722 |
| 2016/0301574 | A1* | 10/2016 | Gupta | H04L 41/12 |
| 2017/0277691 | A1* | 9/2017 | Agarwal | G06F 16/24578 |

FOREIGN PATENT DOCUMENTS

| | | | |
|---|---|---|---|
| CN | 103258020 | A | 8/2013 |
| CN | 104301207 | A | 1/2015 |
| CN | 104520887 | A | 4/2015 |
| CN | 104967679 | A | 10/2015 |
| CN | 103886105 | B * | 5/2017 |

OTHER PUBLICATIONS

Second Office Action and Search Report dated Feb. 24, 2017 from the State Intellectual Property Office of People's Republic of China for Application No. 2015103128707 (Chinese language only) (5 pp.).

First Office Action and Search Report dated Dec. 19, 2016 from the State Intellectual Property Office of People's Republic of China for Application No. 2015103128707 (Chinese language only) (5 pp.).

International Search Report and Written Opinion of the ISA dated Aug. 9, 2016 for PCT Application No. PCT/CN2016/081031 (17 pp.).

* cited by examiner

TIME-DISTRIBUTED AND REAL-TIME PROCESSING IN INFORMATION RECOMMENDATION SYSTEM, METHOD AND APPARATUS

RELATED APPLICATION

This application is a continuation of International Patent Application PCT/CN2016/081031, filed May 4, 2016, which claims priority to Chinese Patent Application No. 201510312870.7, entitled "INFORMATION RECOMMENDATION SYSTEM, METHOD AND APPARATUS", filed with the Chinese Patent Office on Jun. 9, 2015, both of which are incorporated herein by reference in their entirety.

FIELD OF THE TECHNOLOGY

Embodiments of the present invention relate to the field of time-distributed information processing, and in particular to an information recommendation system, method and apparatus.

BACKGROUND OF THE DISCLOSURE

During use of a social network, a user receives target information recommended by a server, and the target information may be an advertisement, news or a video.

Interaction operations such as commenting, liking, and forwarding by friends of the user on the target information affect a click-through rate of the user on the target information. Therefore, to improve a click-through rate of the target information, when receiving a request to obtain information sent by the user by using a client, the server needs to calculate influence forces of all friends of the user on each candidate target information, and recommend candidate target information whose influence force is relatively large as finally recommended target information to the user. For example, when the user possess n friends and the server performs screening to select m pieces of candidate target information in advance, the n friends may perform t types of interaction operations on each candidate target information. When receiving a request to obtain information sent by the user by using a client, the server may obtain influence forces of all the friends on each candidate target information only through m×n×t numbers of calculation. The term client may refer to a client terminal or a client application on a terminal device, or the like.

During implementation of the present invention, the inventor finds that the foregoing technology at least has the following problems:

Generally, a quantity of friends of a user (n) is relatively large. Based on the foregoing processing manner, when the user sends a request to obtain information to a server by using a client, the server needs to perform calculation whose complexity is relatively high. Consequently, the client can obtain a feedback of the server only after a relatively long time.

SUMMARY

In order to resolve problems of the foregoing technology, the embodiments of the present invention provide an information recommendation system, method and apparatus. The technical solutions are as follows:

According to a first aspect of the embodiments of the present invention, an information recommendation system is provided, including: a first client, a recommendation platform and a second client, the first client and the second client having a friend relationship;

the first client being configured to: send, when an interaction operation is performed on target information, an operation type corresponding to the interaction operation to the recommendation platform, the interaction operation including at least one of viewing, commenting, forwarding, marking as interested or marking as uninterested;

the recommendation platform being configured to obtain friend intimacy between the first client and the second client, the friend intimacy being used to indicate an intimacy degree between clients; and calculate, according to the operation type and the friend intimacy, an interaction influence value of the target information for the second client after the interaction operation and store the interaction influence value;

the second client being configured to send a request to obtain information to the recommendation platform; and the recommendation platform being configured to: search, when the request to obtain information is received, for an interaction influence value of each candidate target information for the second client; and perform, according to interaction influence values of pieces of target information for the second client, screening from the pieces of candidate target information to select target information to be recommended to the second client.

According to a second aspect of the embodiments of the present invention, an information recommendation method is provided, applied to a system including a first client, a recommendation platform and a second client, the first client and the second client having a friend relationship, and the method including:

sending, by the first client when an interaction operation is performed on target information, an operation type corresponding to the interaction operation to the recommendation platform, the interaction operation including at least one of viewing, commenting, forwarding, marking as interested or marking as uninterested;

obtaining, by the recommendation platform, friend intimacy between the first client and the second client, the friend intimacy being used to indicate an intimacy degree between clients;

and calculating, according to the operation type and the friend intimacy, an interaction influence value of the target information for the second client after the interaction operation and storing the interaction influence value;

sending, by the second client, a request to obtain information to the recommendation platform; and searching, by the recommendation platform when the request to obtain information is received, for an interaction influence value of each candidate target information for the second client; and performing, according to interaction influence values of pieces of target information for the second client, screening from the pieces of candidate target information to select target information to be recommended to the second client.

According to a third aspect of the embodiments of the present invention, an information recommendation method is provided, including:

receiving an operation type sent by a first client, the operation type being a type of an interaction operation performed by the first client on target information, and the interaction operation including at least one of viewing, commenting, forwarding, marking as interested or marking as uninterested;

obtaining friend intimacy between the first client and a second client, the first client and the second client having a friend relationship; and the friend intimacy being used to indicate an intimacy degree between clients;

calculating, according to the operation type and the friend intimacy, an interaction influence value of the target information for the second client after the interaction operation and storing the interaction influence value;

searching, when a request to obtain information sent by the second client is received, for an interaction influence value of each candidate target information for the second client; and performing, according to interaction influence values of pieces of target information for the second client, screening from the pieces of candidate target information to select target information to be recommended to the second client.

According to a fourth aspect of the embodiments of the present invention, an information recommendation apparatus is provided, including:

a receiving module, configured to receive an operation type sent by a first client, the operation type being a type of an interaction operation performed by the first client on target information, and the interaction operation including at least one of viewing, commenting, forwarding, marking as interested or marking as uninterested;

an obtaining module, configured to obtain friend intimacy between the first client and a second client, the first client and the second client having a friend relationship; and the friend intimacy being used to indicate an intimacy degree between clients;

a first calculation module, configured to calculate, according to the operation type and the friend intimacy, an interaction influence value of the target information for the second client after the interaction operation and store the interaction influence value;

a search module, configured to search, when a request to obtain information sent by the second client is received, for an interaction influence value of each candidate target information for the second client; and a screening module, configured to perform, according to interaction influence values of pieces of target information for the second client, screening from the pieces of candidate target information to select target information to be recommended to the second client.

According to a fifth aspect of the embodiments of the present invention, a recommendation platform is provided, including:

one or more processors; and a memory, the memory storing one or more programs, the one or more programs being configured to be executed by the one or more processors, and the one or more programs including instructions for performing the following operations:

receiving an operation type sent by a first client, the operation type being a type of an interaction operation performed by the first client on target information, and the interaction operation including at least one of viewing, commenting, forwarding, marking as interested or marking as uninterested;

obtaining friend intimacy between the first client and a second client, the first client and the second client having a friend relationship; and the friend intimacy being used to indicate an intimacy degree between clients;

calculating, according to the operation type and the friend intimacy, an interaction influence value of the target information for the second client after the interaction operation and storing the interaction influence value;

searching, when a request to obtain information sent by the second client is received, for an interaction influence value of each candidate target information for the second client; and performing, according to interaction influence values of pieces of target information for the second client, screening from the pieces of candidate target information to select target information to be recommended to the second client.

The technical solutions provided in the embodiments of the present invention bring about the following beneficial effects:

When a client performs an interaction operation on target information, an interaction influence value of the target information for each friend client is calculated in real time, so that when receiving a request to obtain information, a recommendation platform does not need to calculate an influence force of each friend client for candidate target information, so as to reduce calculation complexity of a server when receiving a request to obtain information sent by a client, and resolve a problem that because the calculation complexity is quite high, after sending the request to obtain information to the server, the client of a user can obtain a feedback of the server only after a relatively long time, thereby achieving an effect of improving a server feedback speed.

BRIEF DESCRIPTION OF THE DRAWINGS

To describe the technical solutions of the embodiments of the present invention more clearly, the accompanying drawings for illustrating the embodiments will be introduced briefly in the following. Apparently, the drawings in the following description are only some embodiments of the present invention, and a person of ordinary skill in the art may obtain other drawings based on these accompanying drawings without creative efforts.

DESCRIPTION OF EMBODIMENTS

To make the objectives, technical solutions, and advantages of the present disclosure clearer, the following further describes implementation manners of the present invention in detail with reference to the accompanying drawings.

System Environment

Figure 1:
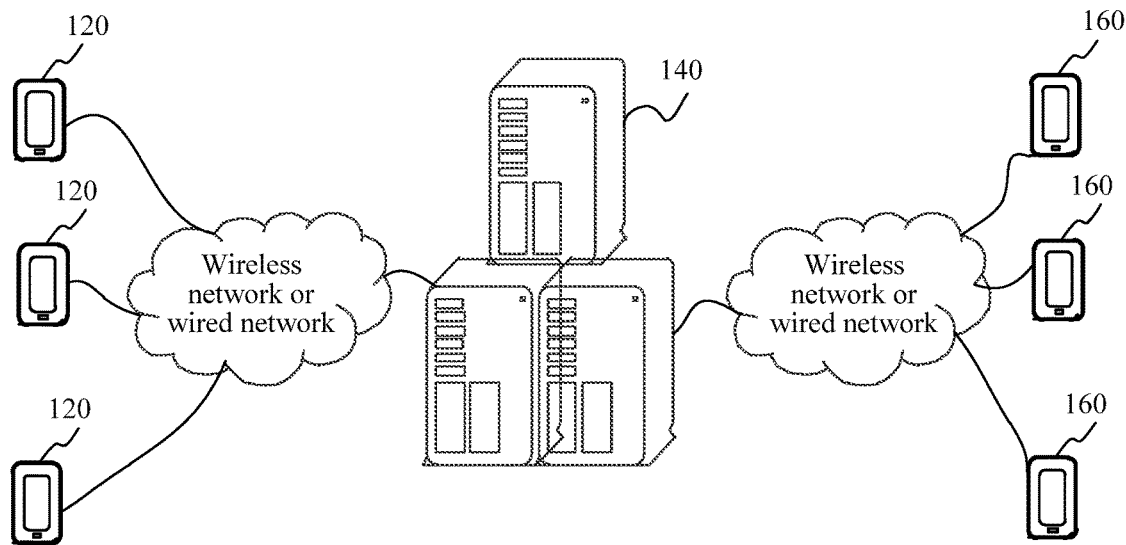
FIG. 1 is an architectural diagram of an information recommendation system according to an embodiment of the present invention.

FIG. 1 is an architectural diagram of an information recommendation system according to an embodiment of the present invention. The system includes: a first client 120, a recommendation platform 140 and a second client 160, and the first client 120 and the second client 160 have a friend relationship. There may be multiple first clients 120 and multiple second clients 160. Each first client 160 may have friend relationship with multiple second clients 160.

The first client 120 may be an application program client, such as a microblog client, a blog client or a social application client. The first client 120 may perform an interaction operation on target information, where the target information may be an advertisement, news or a video or the like, and the interaction operation may be viewing, commenting, forwarding, marking as interested or marking as uninterested or the like. The first client 120 generally needs to be run in a terminal used by a user. The terminal may be a smartphone, an intelligent television, a tablet computer, an e-book reader, an MP3 (Moving Picture Experts Group Audio Layer III) player, an MP4 (Moving Picture Experts Group Audio Layer IV) player, a laptop portable computer, and the like.

The first client 120 and the recommendation platform 140 may be connected to each other by using a wireless network or wired network.

The recommendation platform 140 is a server computer system configured to recommend target information to a client. For example, the recommendation platform 140 may be a server system of a microblog client, a server system of an instant chat program, a server system of a voice chat program, a server system of a social application and the like. The recommendation platform 140 generally includes a single or a cluster of servers, and each server is configured to implement one or more function modules. The recommendation platform 140 further stores friend intimacy level between clients.

The recommendation platform 140 and the second client 160 may be connected to each other by using a wireless network or wired network.

The second client 160 may be an application program client, such as a microblog client, a blog client or a social application client. The second client 160 receives target information recommended by the recommendation platform, where the target information may be an advertisement, news or a video or the like. The second client 160 generally needs to be run in a terminal used by a user. The terminal may be a smartphone, an intelligent television, a tablet computer, an e-book reader, an MP3 (Moving Picture Experts Group Audio Layer III) player, an MP4 (Moving Picture Experts Group Audio Layer IV) player, a laptop portable computer, and the like.

Computer Architecture

Figure 2:
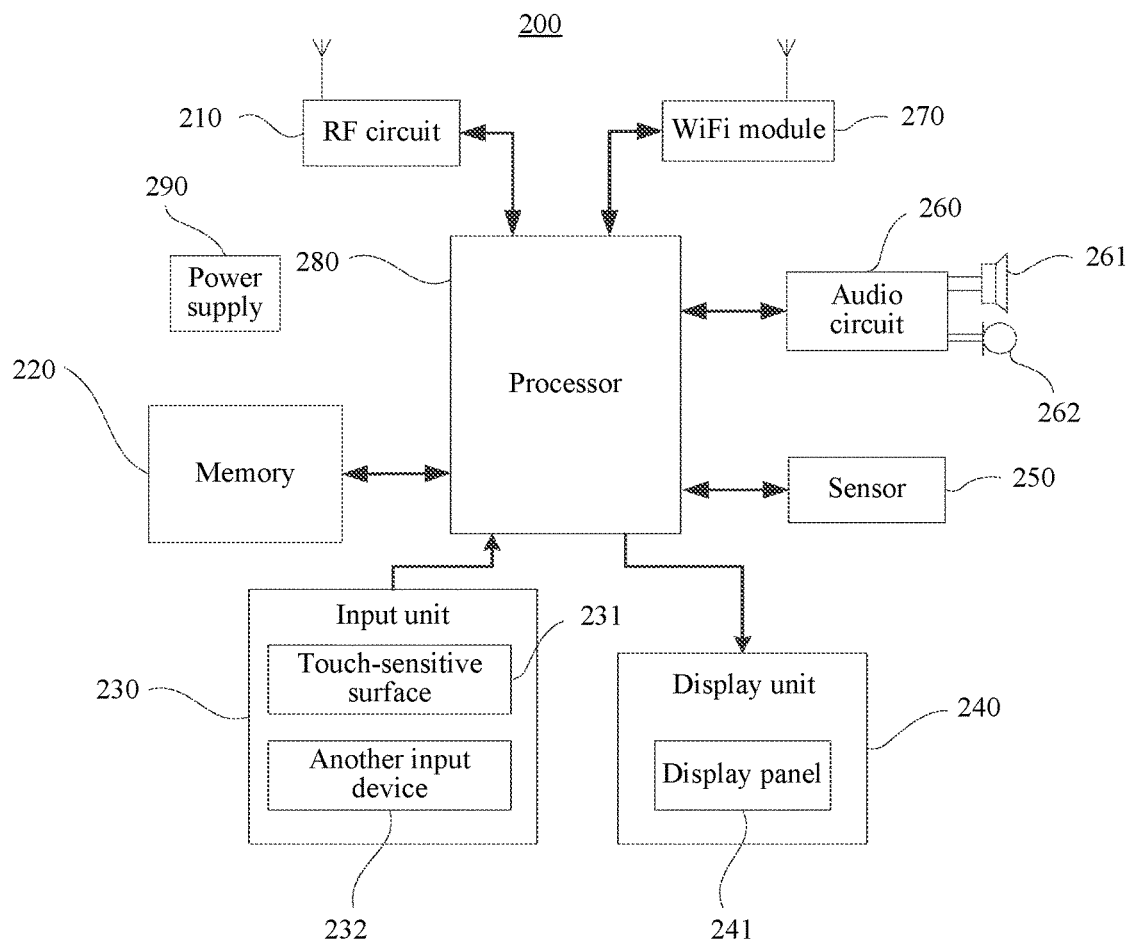
FIG. 2 is a schematic structural and block diagram of a terminal device.

FIG. 2 is a schematic structural diagram of a terminal according to an embodiment of the present invention. The terminal may be configured to run a first client 120 or a second client 160. The terminal may alternatively be referred to as terminal device, mobile terminal, mobile terminal device, client device, and the like. Specifically:

The terminal 200 may include components such as a radio frequency (RF) circuit 210, a memory 220 including one or more computer readable storage media, an input unit 230, a display unit 240, a sensor 250, an audio circuit 260, a short distance wireless transmission module 270, a processor 280 including one or more processing cores, and a power supply 290. A person skilled in the art may understand that the structure of the mobile terminal shown in FIG. 2 does not constitute a limitation to the mobile terminal, and the mobile terminal may include more components or fewer components than those shown in the figure, or some components may be combined, or a different component deployment may be used.

The RF circuit 210 may be configured to receive and send a signal during an information receiving and sending process or a call process. Specifically, the RF circuit receives downlink information from a base station, then delivers the downlink information to one or more processors 280 for processing, and sends related uplink data to the base station. Generally, the RF circuit 210 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 210 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like. The memory 220 may be configured to store a software program and module. For example, the memory 220 may be configured to store a preset time list, may further be configured to store a software program for collecting a voice signal, a software program for implementing key word recognition, a software program for implementing consecutive voice recognition and a software program for implementing reminders setting, and may further be configured to store a binding relationship between a wireless access point and a user account, and the like. The processor 280 runs the software program and module stored in the memory 220, so as to execute various functions, applications and data processing of various implementation of the present disclosure. The memory 220 may mainly include a program storage area and a data storage area. The program storage area may store an operating system, an application program required by at least one function (such as a sound playback function and an image display function), and the like. The data storage area may store data (such as audio data and an address book) created according to use of the mobile terminal 200, and the like. In addition, the memory 220 may include a high speed random access memory, and may also include a non-volatile memory, such as at least one magnetic disk storage device, a flash memory, or another volatile solid storage device. Accordingly, the memory 220 may further include a memory controller, so that the processor 280 and the input unit 230 can access the memory 220.

The input unit 230 may be configured to receive input digit or character information, and generate keyboard, mouse, joystick, optical, or track ball signal input related to the user setting and function control. Specifically, the input unit 230 may include a touch-sensitive surface 231 and another input device 232. The touch-sensitive surface 231 may also be referred to as a touch display screen or a touch panel, and may collect a touch operation of a user on or near the touch-sensitive surface (such as an operation of a user on or near the touch-sensitive surface 231 by using any suitable object or attachment, such as a finger or a touch pen), and drive a corresponding action according to a preset program. Optionally, the touch-sensitive surface 231 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 280. Moreover, the touch controller can receive and execute a command sent from the processor 280. In addition, the touch-sensitive surface 231 may be implemented by using various types, such as a resistive type, a capacitive type, an infrared type, and a surface acoustic wave type. In addition to the touch-sensitive surface 231, the input unit 230 may further include the another input device 232. Specifically, the another input device 232 may include, but is not limited to, one or more of a physical keyboard, a functional key (such as a volume control key or a switch key), a track ball, a mouse, a joystick, and the like.

The display unit 240 may be configured to display information input by the user or information provided for the user, and various graphical user interfaces of the mobile terminal 200. The graphical user interfaces may be formed by a graph, a text, an icon, a video, and any combination thereof. The display unit 240 may include a display panel 241. Optionally, the display panel 241 may be configured by using a liquid crystal display (LCD), an organic light-emitting diode (OLED), or the like. Further, the touch-sensitive surface 231 may cover the display panel 241. After detecting a touch operation on or near the touch-sensitive surface 231, the touch-sensitive surface 231 transfers the touch operation to the processor 280, so as to determine a type of a touch event. Then, the processor 280 provides corresponding visual output on the display panel 241 according to the type of the touch event. Although, in FIG. 2, the touch-sensitive surface 231 and the display panel 241 are used as two separate parts to implement input and output functions, in some embodiments, the touch-sensitive surface 231 and the display panel 241 may be integrated to implement the input and output functions.

The terminal 200 may further include at least one sensor 250, such as an optical sensor, a motion sensor, and other sensors. Specifically, the light sensor may include an ambient light sensor and a proximity sensor. The ambient light sensor may adjust luminance of the display panel 241 according to brightness of the ambient light. The proximity sensor may switch off the display panel 241 and/or backlight when the mobile terminal 200 is moved to the ear of the user. As one type of motion sensor, a gravity acceleration sensor may detect magnitude of accelerations in various directions (which generally are triaxial), may detect magnitude and a direction of the gravity, and may be used for an application that recognizes and utilizes the orientation of the mobile phone (for example, applications for switching between landscape orientation and portrait orientation, video games, and magnetometer orientation calibration), and a function related to vibration recognition and utilization (such as a pedometer and a knock detection). Other sensors, such as a gyroscope, a barometer, a hygrometer, a thermometer, and an infrared sensor, which may be disposed in the mobile terminal 200 are not further described in detail herein.

The audio circuit 260, a loudspeaker 261, and a microphone 262 may provide audio interfaces between the user and the terminal 200. The audio circuit 260 may transmit, to the loudspeaker 261, an electric signal converted from received audio data. The loudspeaker 261 converts the electric signal into a sound signal for output. On the other hand, the microphone 262 converts a collected sound signal into an electric signal. The audio circuit 260 receives the electric signal and converts the electric signal into audio data, and outputs the audio data to the processor 280 for processing. Then, the processor 280 sends the audio data to another mobile terminal by using the RF circuit 210, or outputs the audio data to the memory 220 for further processing. The audio circuit 260 may further include an earphone jack, so as to provide communication between a peripheral earphone and the mobile terminal 200.

The short distance wireless transmission module 270 may be a wireless fidelity (Wi-Fi) module, a Bluetooth module or the like. The terminal 200 may help, by using the short distance wireless transmission module 270, a user to receive and send an e-mail, browse a webpage, and access stream media, and the like, which provides wireless broadband Internet access for the user. Although FIG. 2 shows a short distance wireless transmission module 270, it may be understood that, the short distance wireless transmission module 270 is optional in the mobile terminal 200, and can be ignored according to demands without changing the scope of the essence of the present invention.

The processor 280 is a control center of the mobile terminal 200, and connects to various parts of the mobile terminal by using various interfaces and lines. By running or executing the software program and/or module stored in the memory 220, and invoking data stored in the memory 220, the processor 280 performs various functions and data processing of the mobile terminal 200, thereby performing overall monitoring on the mobile terminal. Optionally, the processor 280 may include one or more processing cores. Optionally, the processor 280 may integrate an application processor and a modem. The application processor mainly processes an operating system, a user interface, an application program, and the like. The modem mainly processes wireless communication. It may be understood that, the foregoing modem may also not be integrated into the processor 280.

The terminal 200 further includes the power supply 290 (such as a battery) for supplying power to the components. Preferably, the power supply may logically connect to the processor 280 by using a power supply management system, thereby implementing functions, such as charging, discharging, and power consumption management, by using the power supply management system. The power supply 290 may further include any component, such as one or more direct current or alternate current power supplies, a recharging system, a power supply fault detection circuit, a power supply converter or an inverter, and a power supply or charge state indicator.

Although not shown in the figure, the terminal 200 may further include a camera, a Bluetooth module, and the like, which are not further described herein.

The terminal 200 further includes a memory and one or more programs. The one or more programs are stored in the memory and configured to execute information recommendation methods according to the following embodiments by means of one or more processors.

In an exemplary embodiment, a non-transitory computer readable storage medium including an instruction is further provided, for example, a memory including an instruction, and the foregoing instruction may be executed by a processor of a mobile terminal to complete the foregoing target information recommendation method. For example, the non-transitory computer readable storage medium may be a ROM (Read-Only Memory), a RAM (Random-Access Memory), a CD-ROM (Compact Disc Read-Only Memory), a magnetic tape, a floppy disk and an optical data storage device.

Figure 3:
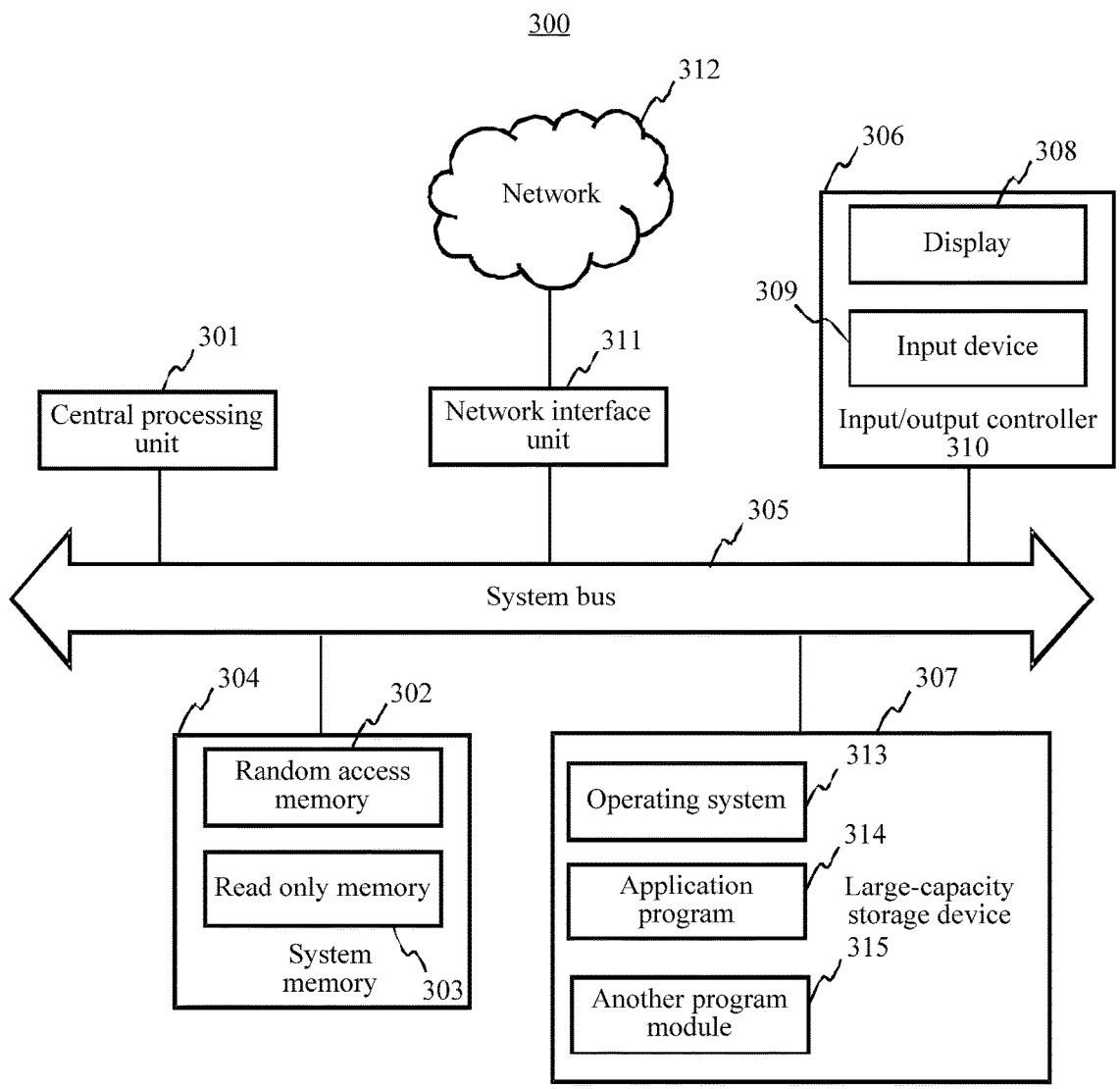
FIG. 3 is a schematic structural and block diagram of a server device.

FIG. 3 is a schematic structural diagram of a server according to an embodiment of the present invention. The server may be a server in a recommendation platform 140. Specifically:

The server 300 includes a central processing unit (CPU) 301, a system memory 304 including a random access memory (RAM) 302 and a read only memory (ROM) 303, and a system bus 305 connecting the system memory 304 and the CPU 301. The server 300 further includes a basic input/output system (I/O system) 306 assisting in transmitting information between devices in a computer, and a large-capacity storage device 307 configured to store an operating system 313, an application program 314 and another program module 315.

The basic I/O system 306 includes a display 308 configured to display information and an input device 309, such as a mouse or a keyboard, configured to input information for a user. The display 308 and the input device 309 are both connected to the CPU 301 by using an input and output controller 310 connected to the system bus 305. The basic I/O system 306 may further include the input and output controller 310 to be configured to receive and process inputs from multiple other devices such as a keyboard, a mouse, and an electronic stylus. Similarly, the input and output controller 310 further provides an output to a display screen, a printer or another type of output device.

The large-capacity storage device 307 is connected to the CPU 301 by using a large-capacity storage controller (not shown) connected to the system bus 305. The large-capacity storage device 307 and its associated computer readable medium provide non-volatile storage for the server 300. That is to say, the large-capacity storage device 307 may include the computer readable medium (not shown) such as a hard disk or a CD-ROM driver.

Without loss of generality, the computer readable medium may include a computer storage medium and a communications medium. The computer storage medium includes volatile and non-volatile media, and removable and non-removable media implemented by using any method or technology used for storing information such as a computer readable instruction, a data structure, a program module or other data. The computer storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. Certainly, persons skilled in art can know that the computer storage medium is not limited to the foregoing several types. The system memory 304 and the large-capacity storage device 307 may be collectively referred to as a memory.

According to various embodiments of the present invention, the server 300 may further be connected, by using a network such as the Internet, to a remote computer on the network and run. That is, the server 300 may be connected to a network 312 by using a network interface unit 311 connected to the system bus 305, or may also be to connected to another type of network or remote computer system (not shown) by using the network interface unit 311.

The foregoing memory further includes one or more programs. The one or more programs are stored in the memory and configured to execute information recommendation methods according to the following embodiments by means of one or more processors, and are configured to be executed by the CPU.

In an exemplary embodiment, a non-transitory computer readable storage medium including an instruction is further provided, for example, a memory including an instruction, and the foregoing instruction may be executed by a processor of a mobile terminal to complete the foregoing video generation method. For example, the non-transitory computer readable storage medium may be a ROM, a RAM, a CD-ROM, a magnetic tape, a floppy disk and an optical data storage device.

Summarization about Exemplary Architecture

To calculate an interaction influence value of a target information for each friend client of a client in real time when the client performs an interaction operation on the target information, thereby reducing calculation complexity and improving a server feedback speed, in an illustrative embodiment:

The first client 120 is configured to: send, when an interaction operation is performed on target information by the first client, an operation type corresponding to the interaction operation to the recommendation platform 140, the interaction operation including at least one of viewing, commenting, forwarding, marking as interested or marking as uninterested, where the target information is at least one of an advertisement, news or a video.

After the first client 120 displays the target information, a user may perform a type of interaction operation such as viewing, commenting, forwarding, marking as interested or marking as uninterested on the target information. When the user performs an interaction operation on the target information, the first client 120 is triggered to send an operation request corresponding to the target information to the recommendation platform 140, where the operation request may carry an operation type corresponding to the interaction operation and an identifier of the target information.

Figure 4A:
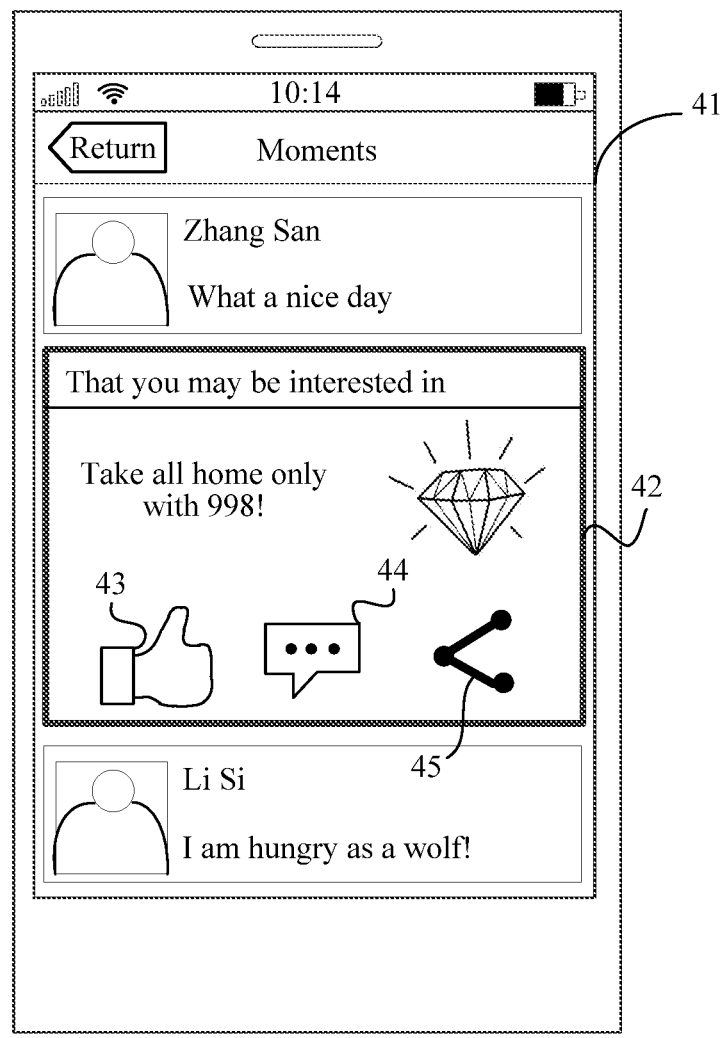
FIG. 4A and FIG. 4B shows an implementation of an interface for information recommendation.

For example, as shown in FIG. 4A, a first client 41 displays target information 42, and the target information 42 provides a liking button 43, a commenting button 44 and a sharing button 45. When a user clicks the sharing button 45, the first client 41 sends, to the recommendation platform, an operation request for which an operation type of the target information 42 is sharing. The operation request may be sent in addition to performing the actual sharing function.

The recommendation platform 140 is configured to obtain friend intimacy level between the first client 120 and the second client 160, the friend intimacy level being used to indicate an intimacy degree between clients; and calculate, according to the operation type and the friend intimacy level, an interaction influence value of the target information for the second client 160 after the interaction operation and store the interaction influence value. The term intimacy level may be simply referred to as intimacy.

The friend intimacy is used to indicate an intimacy degree between clients, and the friend intimacy may be obtained by performing calculation according to a quantity of common interest points between clients, a frequency of communication between clients or a quantity of cross comments between clients. A larger quantity of common interest points between clients, a higher frequency of communication between clients or a larger quantity of cross comments between clients indicates higher friend intimacy between clients.

Influence degrees between clients may be different, that is to say, friend intimacy of the first client 120 to the second client 160 and friend intimacy of the second client 160 to the first client 120 may be different. Therefore, after receiving the operation request of the first client 120, the recommendation platform 140 may specifically obtain the friend intimacy of the first client 120 to the second client 160.

The friend intimacy between the first client 120 and the second client 160 is maintained in the recommendation platform 140, and when receiving the operation type sent by the first client 120, the recommendation platform 140 may obtain the friend intimacy between or to the first client 120 and the second client 160. It should be noted that, the recommendation platform 140 may obtain friend intimacy between or to the first client 120 and all friend clients 160.

After obtaining the friend intimacy between the first client 120 and the second client 160, the recommendation platform 140 calculates an interaction influence value of the target information for the second client 160 according to the operation type and the friend intimacy. When operations are positive interaction operations (viewing, commenting, forwarding, or marking as interested), the friend intimacy and the interaction influence value are in a positively related relationship; when operations are negative interaction operations (marking as uninterested), the friend intimacy and the interaction influence value are in a negatively related relationship. For example, friend intimacy between a client A and a client B is 0.8, friend intimacy between the client A and a client C is 0.1, and when the client A performs an interaction operation on target information, an interaction influence value of the target information for the client B is greater than an interaction influence value of the target information for the client C. The same target information may be positively or negatively operated on by multiple clients and the multiple clients may all have the second client 160 as friend. In that situation, the interaction influence value of this target information for the second client 160 may be accumulated (i.e., individual influence is added to the accumulated interaction influence value when positive, and subtracted from the accumulated interaction influence value when negative). Alternative implementation for attenuated accumulation or modification of the interaction influence value will be discussed in more detail below.

After performing calculation to obtain the interaction influence value of the target information for the second client 160, the recommendation platform 140 establishes an index between the target information and the interaction influence value with descending interaction influence value by using an identifier of the second client 160 as a keyword.

It should be noted that, the recommendation platform 140 may further similarly establish a descending index between the target information and an interaction influence value for the second client 160 for each interaction operation type, that is, the recommendation platform may store the interaction influence value from different dimensions each corresponding to a type of interaction operation. This is not limited in the present invention.

Specifically, the recommendation platform 140 is further configured to: determine, according to the friend intimacy, an interaction influence value of the target information corresponding to the operation type for the second client 160 after the interaction operation, and store the interaction influence value.

The recommendation platform 140 may separately store an interaction influence value of target information corresponding to each operation type for the second client 160, that is, each operation type is independently stored, and each operation type separately corresponds to an interaction influence value of a piece of target information for the second client 160. After obtaining the intimacy between the first client 120 and the second client 160, the recommendation platform 140 may further determine, according to the operation type carried in the operation request sent by the first client 120 and according to the friend intimacy, the interaction influence value of the target information corresponding to the operation type for the second client 160. That is to say, each time the recommendation platform 140 receives an operation request carrying an operation type and sent by a client, the recommendation platform 140 may obtain all friend clients of the client in real time, calculate, according to friend intimacy between the client and each friend client, an interaction influence value of target information corresponding to the operation type for each friend client after the interaction operation and store the interaction influence value.

The second client 160 is configured to send a request to obtain information to the recommendation platform 140.

For example, when enabling a moments function in, e.g., WeChat developed by Tencent Technology (Shenzhen) Company Limited, the second client 160 sends a request to obtain information to the recommendation platform 140, and the request to obtain information carries the identifier of the second client 160.

The recommendation platform 140 is configured to: search, when the request to obtain information is received, for an interaction influence value of each candidate target information for the second client 160; and perform, according to interaction influence values of pieces of target information for the second client, screening from the pieces of candidate target information to select target information to be recommended to the second client 160.

The recommendation platform 140 already stores an interaction influence value of each candidate target information for the second client 160, and therefore when receiving the request to obtain information sent by the second client 160, the recommendation platform 140 does not need to calculate an interaction influence value of each friend client of the second client 160 for each candidate target information, but only needs to search a stored correspondence between target information and an interaction influence value for an interaction influence value corresponding to candidate target information for the second client 160, thereby reducing calculation complexity, and improving a feedback and response speed of the recommendation platform 140.

The recommendation platform 140 may determine target information of pieces of candidate target information whose interaction influence value is greater than a preset threshold as target information to be recommended to the second client 160, and the second client 160 displays the target information. The recommended target information may contain multiple pieces of target information.

Figure 4B:
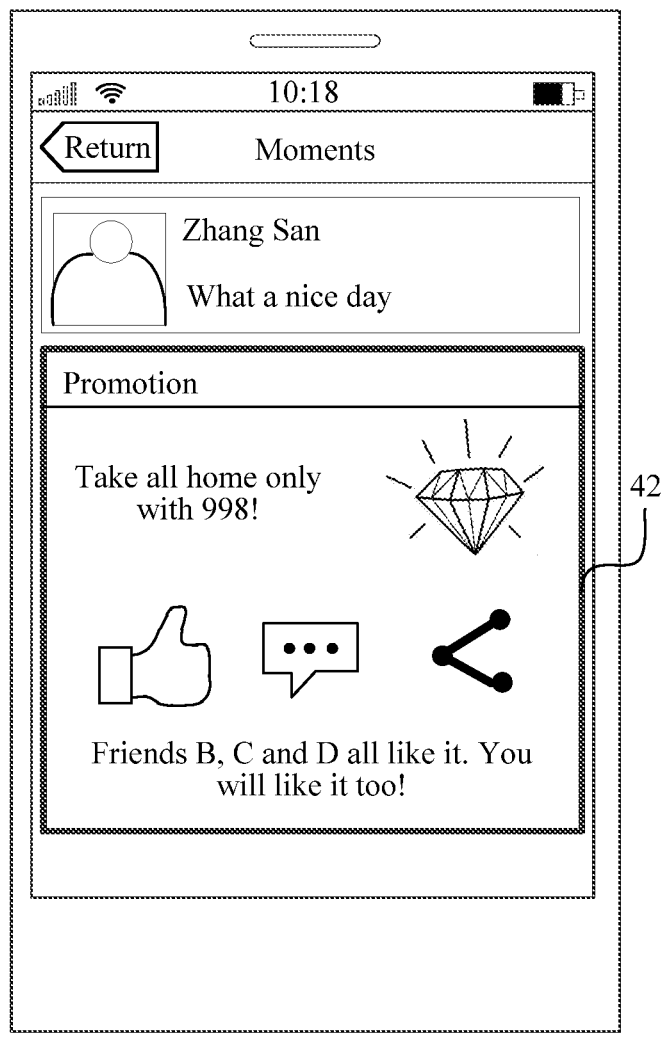

For example, as shown in FIG. 4B, when the recommendation platform receives liking operations performed by friend clients B, C, and D of a client A on the target information 42, and assuming that the target information 42 is target information among pieces of candidate target information having the maximum interaction influence value, the recommendation platform sends the target information 42 as recommended target information to the client A upon receiving request from client A for recommendation, and the client A displays the target information 42, and displays the friend clients B, C, and D indicating that they have performed the liking operation on the target information 42.

Additionally, if the recommendation platform 140 independently stores each operation type, the recommendation platform 140 is further configured to: when the request to obtain information is received, search, for each candidate target information, for an interaction influence value of target information corresponding to each operation type for the second client; and perform, according to the interaction influence value of the target information corresponding to the each operation type of pieces of target information for the second client, screening from pieces of candidate target information to select target information to be recommended to the second client.

For each candidate target information, the recommendation platform 140 may pre-store an interaction influence value of each operation type corresponding to the second client 160. When the recommendation platform 140 receives the request to obtain information, for each target information, an interaction influence value corresponding to each operation type may be separately obtained, and then screening may be performed from pieces of candidate target information according to the obtained interaction influence value corresponding to each operation type to select target information to be recommended to the second client.

Interaction influence brought by different interaction operations performed on same target information are largely different. In this case, the recommendation platform 140 is further configured to: obtain an operation weight corresponding to the each operation type; and perform, according to the operation weight corresponding to the each operation type, and an interaction influence value of the target information corresponding to the each operation type of the pieces of target information for the second client, screening from the pieces of candidate target information to select target information to be recommended to the second client.

The recommendation platform 140 may pre-store an operation weight corresponding to each operation type. For each target information, after obtaining the interaction influence value of the target information corresponding to each operation type for the second client, the recommendation platform 140 may obtain the operation weight corresponding to each operation type, and then perform weighted summation on the interaction influence value corresponding to each operation type, to obtain a final interaction influence value of the target information for the second client. For example, for target information A and a second client B, the recommendation platform 140 performs search separately to find that an interaction influence value corresponding to an operation type 1 is 0.2, an interaction influence value corresponding to an operation type 2 is 0.4, an interaction influence value corresponding to an operation type 3 is 0.5, and the respective corresponding weights are a, b, and c. Thus a final interaction influence value of the target information A for the second client B is 0.2*a+0.4*b+0.5*c. Then, the recommendation platform 140 may perform, according to obtained final interaction influence values of pieces of target information for the second client, screening from pieces of candidate target information to select target information to be recommended to the second client.

An interaction influence value of target information for a client may gradually decreases as time changes, and therefore the recommendation platform 140 may further store a recent modification time of the interaction influence value of each target information for the second client. Optionally, the recommendation platform 140 is configured to calculate a time difference between the recent modification time of the each target information and a receiving time of the request to obtain information; perform time attenuation calculation on the interaction influence value of the each target information for the second client according to the time difference of the each target information; and perform, according to interaction influence values of the pieces of target information for the second client after the time attenuation calculation, screening from the pieces of candidate target information to select target information to be recommended to the second client.

For example, the recommendation platform 140 stores an interaction influence value of the target information A for the second client 160 that is 0.8, and a recent modification time of the interaction influence value is 12:00:00, Apr. 1, 2015. If time at which the recommendation platform 140 receives the request to obtain information sent by the second client 160 is 12:00:00, Apr. 2, 2015, the recommendation platform 140 performs time attenuation calculation on the interaction influence value being 0.8 according to 24 hours, and determines an interaction influence value after the time attenuation calculation as a real-time interaction influence value, and the real-time interaction influence value is less than 0.8. The stored interaction influence value may be multiplied by a weight less than 1, and the weight may be in inverse proportion to a time difference, for example, the weight may be a reciprocal of the time difference. The attenuation may alternatively be an exponential attenuation with a predetermined time constant, of, e.g., 1 day, 1 week, and the like.

A same piece of target information may correspond to n interaction operations successively performed, and the n interaction operations may be from one or more first clients, and therefore the recommendation platform 140 needs to update the stored interaction influence value in real time, thereby ensuring accuracy of the interaction influence value.

Optionally, the recommendation platform 140 is configured to calculate, for any one of the n the interaction operations and according to the operation type of the interaction operation and the friend intimacy, a single-time interaction influence value of the target information for the second client after the interaction operation.

Each time the recommendation platform 140 receives an interaction operation performed by the first client 120 on the target information, the recommendation platform 140 needs to calculate an interaction influence value of the current interaction operation for the second client 140 according to the operation type and the friend intimacy, that is, a single-time interaction influence value.

After calculating the single-time interaction influence value, the recommendation platform 140 is further configured to obtain, for any two neighboring times of the interaction operation, the ith accumulated interaction influence value of the target information for the second client and an execution time of the ith interaction operation; perform time attenuation calculation on the ith accumulated interaction influence value according to the execution time of the ith interaction operation and an execution time of the (i+1)th interaction operation; and perform, according to the ith attenuated accumulated interaction influence value after the time attenuation calculation and a single-time interaction influence value of the (i+1)th interaction operation, update to obtain the (i+1)th accumulated interaction influence value; and the recommendation platform 140 is further configured to determine the execution time of the nth interaction operation as a recent modification time of the target information, where 1≤i≤n−1. The processing steps above runs from i=1 to i=n−1.

The recommendation platform 140 may receive, at different moments, an interaction operation performed by one or more first clients 120 on same target information, but because multiple times of interaction operation are not executed at the same time, and a historical interaction influence value attenuates with time, simple accumulation cannot be performed when an accumulated interaction influence value is calculated.

The recommendation platform 140 needs to obtain a modification time of the stored interaction influence value, calculate a time difference between the modification time and an execution time at which an interaction operation is executed on the target information last time, and perform time attenuation calculation on the stored interaction influence value according to the time difference. Then, calculation is performed according to an interaction influence value through the time attenuation calculation and a single-time interaction influence value of the last-time interaction operation, to obtain an accumulated interaction influence value after the last-time interaction operation.

For example, two friend clients of a second client C, that is, a first client A and a first client B, successively perform an interaction operation on same target information, and time at which the first client A performs the interaction operation is 12:00:00, Apr. 1, 2015 (an execution time of the first-time interaction operation), and a corresponding single-time interaction influence value is a first interaction influence value; time at which the first client B performs the interaction operation is 12:00:00, Apr. 2, 2015 (an execution time of the second-time interaction operation), and a corresponding single-time interaction influence value is a second interaction influence value. The recommendation platform 140 first needs to perform calculation according to the execution time of the first-time interaction operation and the execution time of the second-time interaction operation to obtain a time difference (24 hours), then perform time attenuation calculation on the first interaction influence value according to the time difference, and perform update according to the first interaction influence value after the time attenuation calculation and the second interaction influence value to obtain the second-time accumulated interaction influence value. The accumulated interaction influence value is updated according to the second interaction influence value, and therefore the recommendation platform further needs to determine the execution time of the second-time interaction operation, that is, 12:00:00, Apr. 2, 2015, as the recent modification time. That is to say, whenever the recommendation platform 140 receives an operation request, for each friend client, a sum of the historical interaction influence value after the time attenuation calculation is performed and the single-time interaction influence value corresponding to the current interaction operation may be used as an interaction influence value after the current interaction operation.

Interaction influence brought by different interaction operations performed on same target information are largely different. Therefore, to enable an interaction influence value obtained through calculation to more conform to an interaction operation of a friend of the user, the recommendation platform needs to calculate an interaction influence value of target information according to an operation weight corresponding to an operation type. Optionally, when the recommendation platform 140 calculates, for any one of the n interaction operations and according to the operation type of the interaction operation and the friend intimacy, a single-time interaction influence value of the target information for the second client after the interaction operation, the recommendation platform 140 is specifically configured to:

search, for any one of the n interaction operations, for a corresponding operation weight according to the operation type of the interaction operation; and calculate, according to the operation weight and the friend intimacy, the single-time interaction influence value of the target information for the second client after the interaction operation is performed.

A magnitude relationship between operation weights corresponding to different operation types is: marking as uninterested <0<viewing≤marking as interested≤forwarding≤commenting.

The recommendation platform 140 stores a correspondence between an operation type and an operation weight, and an example of the correspondence may be schematically shown in Table 1.

TABLE 1

| Operation type | Operation weight |
| --- | --- |
| marking as uninterested | −1 |
| viewing | 0.2 |
| marking as interested | 1 |
| forwarding | 1.2 |
| commenting | 1.6 |

To sum up, in the information recommendation system provided in this embodiment, when a client performs an interaction operation on target information, an interaction influence value of the target information for each friend client is calculated in real time, so that when receiving a request to obtain information, a recommendation platform does not need to calculate an influence force of each friend client for candidate target information, so as to resolve a problem that because calculation complexity is quite high, after sending the request to obtain information to a server, a user can obtain a feedback of the server only after a relatively long time, thereby achieving effects of reducing the calculation complexity and improving a server feedback speed. The solution provided here is technical in nature, involving tracking electronic data in a database and calculating the interaction influence values, their time attenuation, and accumulation to a single value in particular ways. For example, rather than performing main data processing for operation influence value between friends when the information request is received from a second client 160, a significant amount of processing may be distributed over time while pieces of information is being operated by first clients 120, with help from appropriately established recommendation databases at the recommendation platform 140.

The database above may be referred to as friend database as it may be used to store friend intimacy, interaction influence values, time for interaction operation, and the like.

In some implementation above, the recommendation platform performs time attenuation calculation on an interaction influence value according to an time difference between a recent modification time of the interaction influence value and a receiving time of a request to obtain information, so that the interaction influence value obtained through calculation is more accurate, thereby improving a click-through rate of a user for recommended target information.

In some implementation above, when receiving interaction operations performed by n first clients successively on same target information, the recommendation platform performs time attenuation calculation on a historical interaction influence value, and performs update with reference to an interaction influence value corresponding to the last-time interaction operation, to obtain a final interaction influence value, so that the interaction influence value obtained through calculation is more accurate, thereby improving a click-through rate of a user for recommended target information.

In some implementation above, the recommendation platform searches for corresponding operation weights according to different operation types, and calculates an interaction influence value of target information for the second client according to the operation weights and friend intimacy, so that the interaction influence value obtained through calculation more conforms to an actual situation, thereby improving a click-through rate of a user for recommended target information.

In some implementation above, the recommendation platform further integrates a negative interaction operation such as marking as uninterested into interaction influence value calculation, so that an interaction influence value obtained through calculation more conforms to an interaction operation of a friend of a user, thereby improving a click-through rate of the user for recommended target information.

Figure 5:
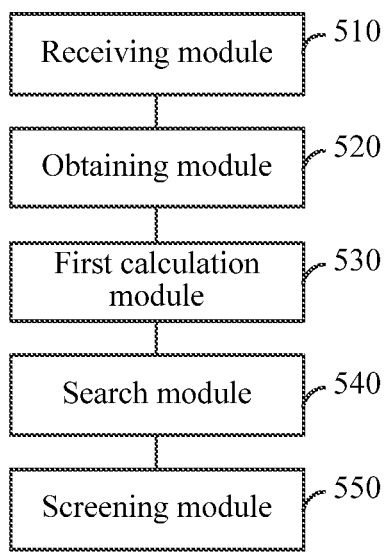
FIG. 5 is a structure block diagram of an information recommendation apparatus.

FIG. 5 is a structure block diagram of an information recommendation apparatus according to an embodiment of the present invention. The information recommendation apparatus may be implemented by using software, hardware or a combination of the two to become a part or all of the recommendation platform 140 in FIG. 1. The information recommendation apparatus 500 includes: a receiving module 510, an obtaining module 520, a first calculation module 530, a search module 540 and a screening module 550.

The receiving module 510 is configured to receive an operation type sent by a first client, the operation type being a type of an interaction operation performed by the first client on target information, and the interaction operation including at least one of viewing, commenting, forwarding, marking as interested or marking as uninterested.

The obtaining module 520 is configured to obtain friend intimacy between the first client and a second client, the first client and the second client having a friend relationship; and the friend intimacy being used to indicate an intimacy degree between clients.

The first calculation module 530 is configured to calculate, according to the operation type and the friend intimacy, an interaction influence value of the target information for the second client after the interaction operation and store the interaction influence value.

The search module 540 is configured to search, when a request to obtain information sent by the second client is received, for an interaction influence value of each candidate target information for the second client.

The screening module 550 is configured to perform, according to interaction influence values of pieces of target information for the second client, screening from the pieces of candidate target information to select target information to be recommended to the second client.

Figure 6:
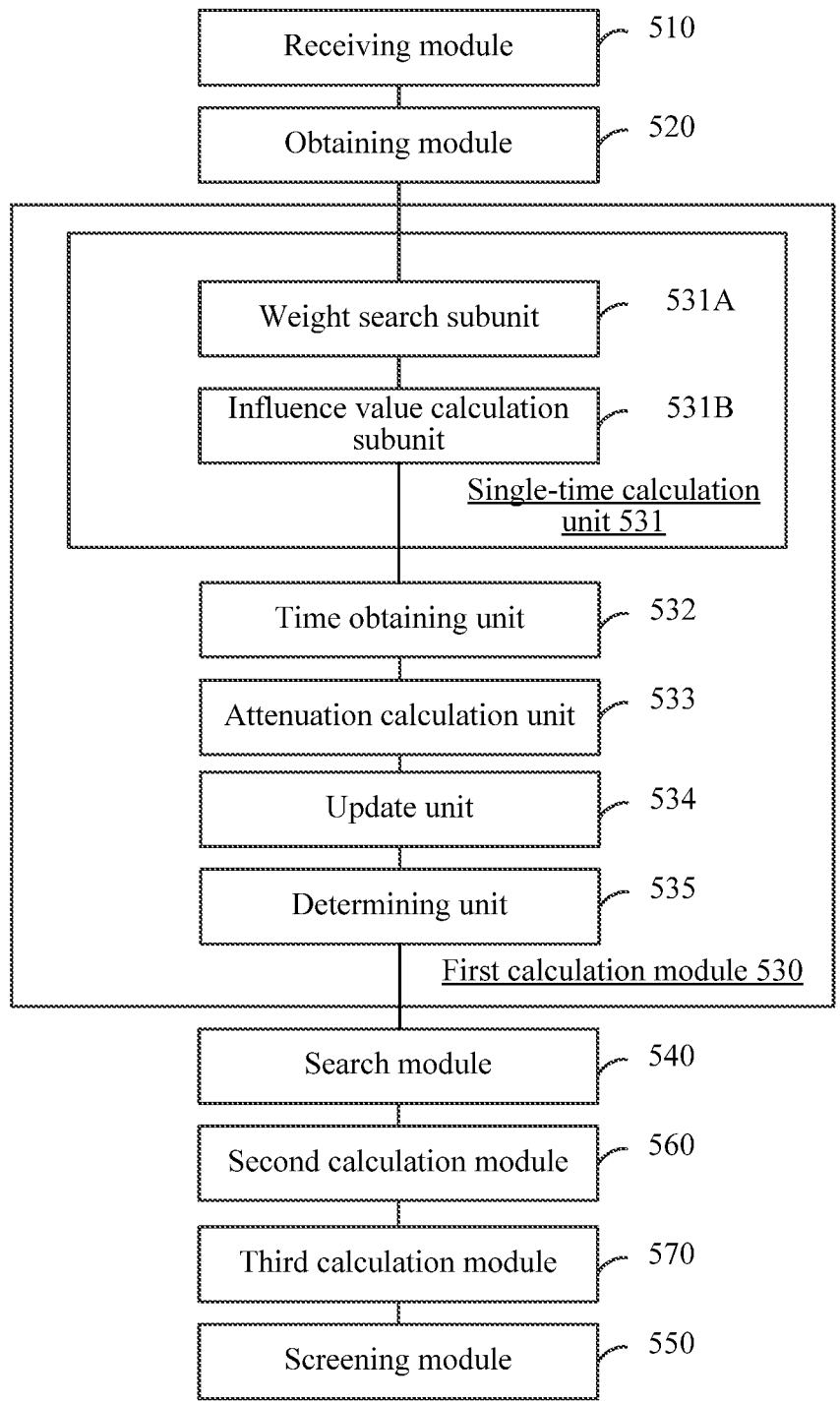
FIG. 6 is a structure block diagram of an information recommendation apparatus.

In an optional embodiment, as shown in FIG. 6, the recommendation platform further stores a recent modification time of the interaction influence value of the each target information for the second client, and the information recommendation apparatus further includes:

a second calculation module 560, configured to calculate a time difference between the recent modification time of the each target information and a receiving time of the request to obtain information; and a third calculation module 570, configured to perform time attenuation calculation on the interaction influence value of the each target information for the second client according to the time difference of the each target information; and the screening module 550 is further configured to perform, according to interaction influence values of the pieces of target information for the second client after the time attenuation calculation, screening from the pieces of candidate target information to select target information to be recommended to the second client.

In an optional embodiment, as shown in FIG. 6, when a same piece of target information corresponds to n interaction operations performed successively, where n≥2, the first calculation module 530 includes:

a single-time calculation unit 531, configured to calculate, for any one of the n interaction operations and according to the operation type of the interaction operation and the friend intimacy, a single-time interaction influence value of the target information for the second client after the interaction operation;

a time obtaining unit 532, configured to obtain, for any two neighboring times of the interaction operation, the ith accumulated interaction influence value of the target information for the second client and an execution time of the ith interaction operation;

an attenuation calculation unit 533, configured to perform time attenuation calculation on the ith accumulated interaction influence value according to the execution time of the ith interaction operation and an execution time of the (i+1)th interaction operation;

an update unit 534, configured to perform, according to the ith attenuated accumulated interaction influence value after the time attenuation calculation and a single-time interaction influence value of the (i+1)th interaction operation, update to obtain the (i+1)th accumulated interaction influence value; and a determining unit 535, configured to determine the execution time of the nth interaction operation as a recent modification time of the target information, where 1≤i≤n−1.

In an optional embodiment, the single-time calculation unit 531 includes:

a weight search subunit 531A, configured to search, for any one of the n interaction operations, for a corresponding operation weight according to the operation type of the interaction operation; and an influence value calculation subunit 531B, configured to calculate, according to the operation weight and the friend intimacy, the single-time interaction influence value of the target information for the second client after the interaction operation is performed.

In an optional embodiment, the interaction influence value of the target information for the second client includes: an interaction influence value of target information corresponding to each operation type for the second client; and the first calculation module 530 is configured to: determine, according to the friend intimacy, an interaction influence value of the target information corresponding to the operation type for the second client after the interaction operation, and store the interaction influence value.

In an optional embodiment, the screening module 550 is configured to:

obtain an operation weight corresponding to the each operation type; and perform, according to the operation weight corresponding to the each operation type, and an interaction influence value of the target information corresponding to the each operation type of the pieces of target information for the second client, screening from the pieces of candidate target information to select target information to be recommended to the second client.

In an optional embodiment, a magnitude relationship between operation weights corresponding to different operation types is: marking as uninterested <0<viewing≤marking as interested≤forwarding≤commenting.

In an optional embodiment, the target information is at least one of an advertisement, news or a video.

To sum up, in the information recommendation apparatus provided in this embodiment, when a client performs an interaction operation on target information, an interaction influence value of the target information for each friend client is calculated in real time, so that when receiving a request to obtain information, a recommendation platform does not need to calculate an influence force of each friend client for candidate target information, so as to resolve a problem that because calculation complexity is quite high, after sending the request to obtain information to a server, a user can obtain a feedback of the server only after a relatively long time, thereby achieving effects of reducing the calculation complexity and improving a server feedback speed.

In some implementation above, the recommendation platform performs time attenuation calculation on an interaction influence value according to an time difference between a recent modification time of the interaction influence value and a receiving time of a request to obtain information, so that the interaction influence value obtained through calculation is more accurate, thereby improving a click-through rate of a user for recommended target information.

In some implementation above, when receiving interaction operations performed by n first clients successively on same target information, the recommendation platform performs time attenuation calculation on a historical interaction influence value, and performs update with reference to an interaction influence value corresponding to the last-time interaction operation, to obtain a final interaction influence value, so that the interaction influence value obtained through calculation is more accurate, thereby improving a click-through rate of a user for recommended target information.

In some implementation above, the recommendation platform searches for corresponding operation weights according to different operation types, and calculates an interaction influence value of target information for the second client according to the operation weights and friend intimacy, so that the interaction influence value obtained through calculation more conforms to an actual situation, thereby improving a click-through rate of a user for recommended target information.

In some implementation above, the recommendation platform further integrates a negative interaction operation such as marking as uninterested into interaction influence value calculation, so that an interaction influence value obtained through calculation more conforms to an interaction operation of a friend of a user, thereby improving a click-through rate of the user for recommended target information.

Figure 7A:
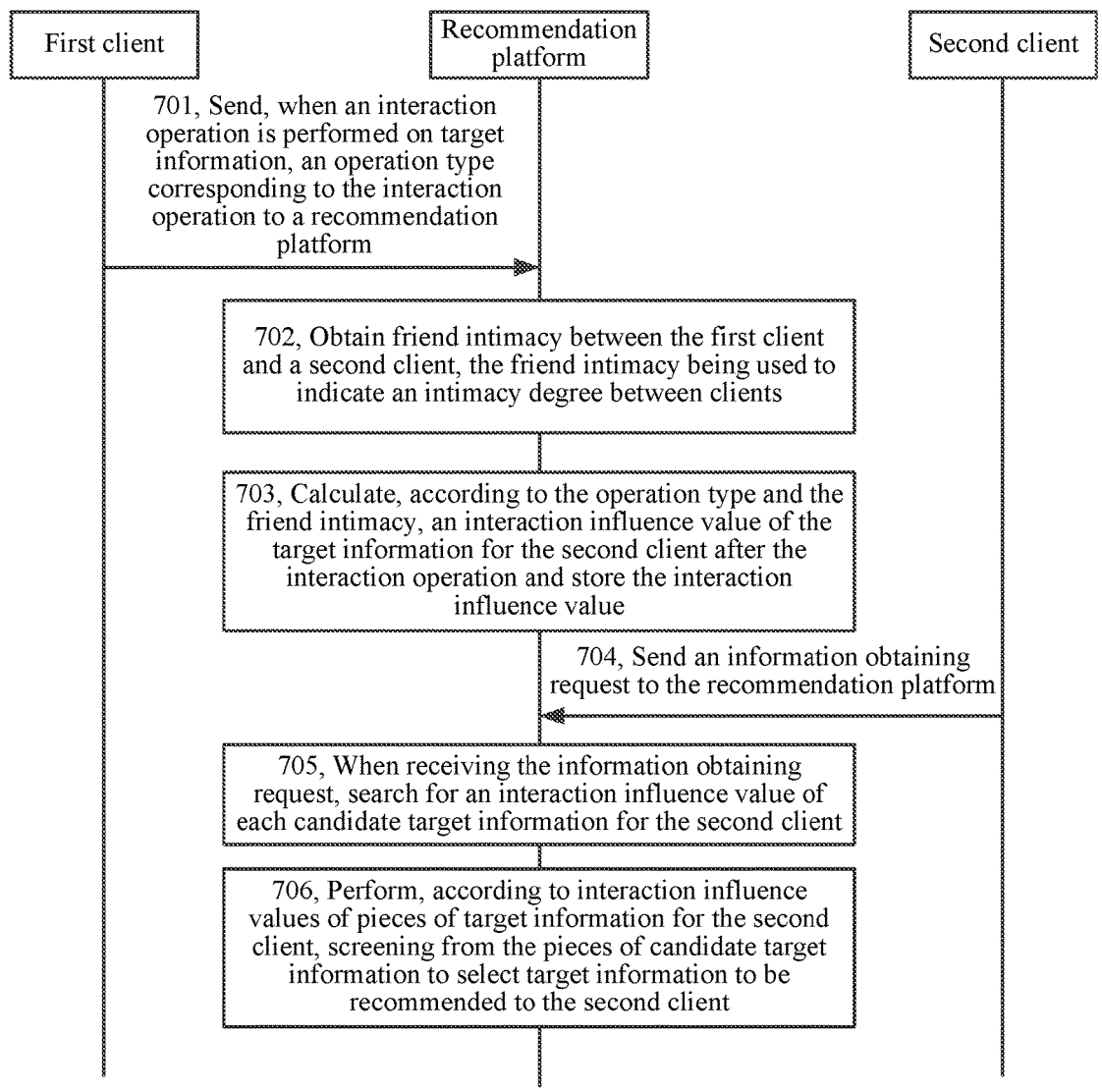
FIG. 7A is a logic flow of an information recommendation method.

FIG. 7A is an example flowchart of an information recommendation method according to an embodiment of the present invention. In this embodiment, an example in which the method is applied to the system shown in FIG. 1 is described, and the method includes:

Step 701: A first client sends, when an interaction operation is performed on target information, an operation type corresponding to the interaction operation to a recommendation platform.

The first client may be a microblog client, a blog client or a social application client; the target information may be information that conforms to an interest point of the first client or that is sent by the recommendation platform to the first client according to the interest point obtained in advance, or the target information may be an advertisement, news or a video.

The first client displays the received target information, and receives an interaction operation performed by a user on the target information by using the first client. The interaction operation includes at least one of viewing, commenting, forwarding, marking as interested or marking as uninterested.

After receiving the interaction operation, the first client sends an operation request of the current interaction operation to the recommendation platform, and moreover, the first client further needs to send an identifier of the first client and an identifier of the target information together to the recommendation platform.

For example, as shown in FIG. 4A, a first client 41 displays received target information 42, and the target information 42 provides a liking button 43, a commenting button 44 and a sharing button 45. When a user clicks the sharing button 45, the first client 41 sends, to the recommendation platform, an operation type for which an operation type of the target information 42 is sharing.

Step 702: The recommendation platform obtains friend intimacy between the first client and a second client, the friend intimacy being used to indicate an intimacy degree between clients.

The friend intimacy is used to indicate an intimacy degree between clients, and the friend intimacy may be obtained by performing calculation according to a quantity of common interest points between clients, a frequency of communication between clients or a quantity of cross comments between clients. A larger quantity of common interest points between clients, a higher frequency of communication between clients or a larger quantity of cross comments between clients indicates higher friend intimacy between clients. A manner of calculating friend intimacy between clients is not limited in the present invention.

It should be noted that, the friend relationship between clients may be bidirectional or unidirectional. For example, the client A may be in a friend list of the client B, but the client B may not be in a friend list of the client A; and the friend intimacy between clients is a bidirectional value, that is, friend intimacy for the client A with the client B and friend intimacy for the client B with the client A may be different. For example, the friend intimacy for the client A with the client B may be 0.8, but the friend intimacy for the client B with the client A may be 0.6.

The friend intimacy between clients is maintained in the recommendation platform, and when receiving the operation type sent by the first client, the recommendation platform may obtain the friend intimacy between the first client and the second client. It should be noted that, when the first client has multiple friend clients, the recommendation platform needs to obtain the friend intimacy between the first client and all the friend clients. An example for the friend intimacy between clients that is maintained in the recommendation platform may be schematically shown in Table 2.

TABLE 2

| Client | Friend client | Friend intimacy |
|---|---|---|
| UserA | UserB | 0.2 |
| UserA | UserC | 0.5 |
| UserB | UserA | 0.4 |
| UserB | UserC | 0.1 |
| UserB | UserD | 0.8 |
| UserC | UserD | 0.3 |

After receiving the operation request carrying the interaction operation and sent by the first client, the recommendation platform may search for friend intimacy between the first client and each friend client.

Step 703: The recommendation platform calculates, according to the operation type and the friend intimacy, an interaction influence value of the target information for the second client after the interaction operation and stores the interaction influence value.

For any one-time interaction operation, the recommendation platform calculates, according to the operation type of the interaction operation and the friend intimacy, a single-time interaction influence value of the target information for the second client after the interaction operation.

For two clients that have a friend relationship, performing, by one of the clients, an interaction operation on target information may provide an interaction influence force to the other client, thereby urging the other client to also perform an interaction operation on the target information. A magnitude of the interaction influence force is also related to friend intimacy between the two clients and characterized by the interaction influence value. Higher friend intimacy between the two clients indicates a larger interaction influence value corresponding to a larger interaction influence force; lower friend intimacy between the two clients indicates a smaller interaction influence value corresponding to a smaller interaction influence force.

Specifically, the recommendation platform may further determine, according to the friend intimacy, an interaction influence value of the target information corresponding to the operation type for the second client after the interaction operation, and store the interaction influence value.

The recommendation platform may separately store an interaction influence value of target information corresponding to each operation type for the second client, that is, each operation type is independently stored, and each operation type separately corresponds to an interaction influence value of a piece of target information for the second client. After obtaining the intimacy between the first client and the second client, the recommendation platform may further determine, according to the operation type carried in the operation request sent by the first client and according to the friend intimacy, the interaction influence value of the target information corresponding to the operation type for the second client. That is to say, each time the recommendation platform receives an operation request carrying an operation type and sent by a client, the recommendation platform may obtain all friend clients of the client in real time, calculate, according to friend intimacy between the client and each friend client, an interaction influence value of target information corresponding to the operation type for each friend client after the interaction operation and store the interaction influence value.

Figure 7B:
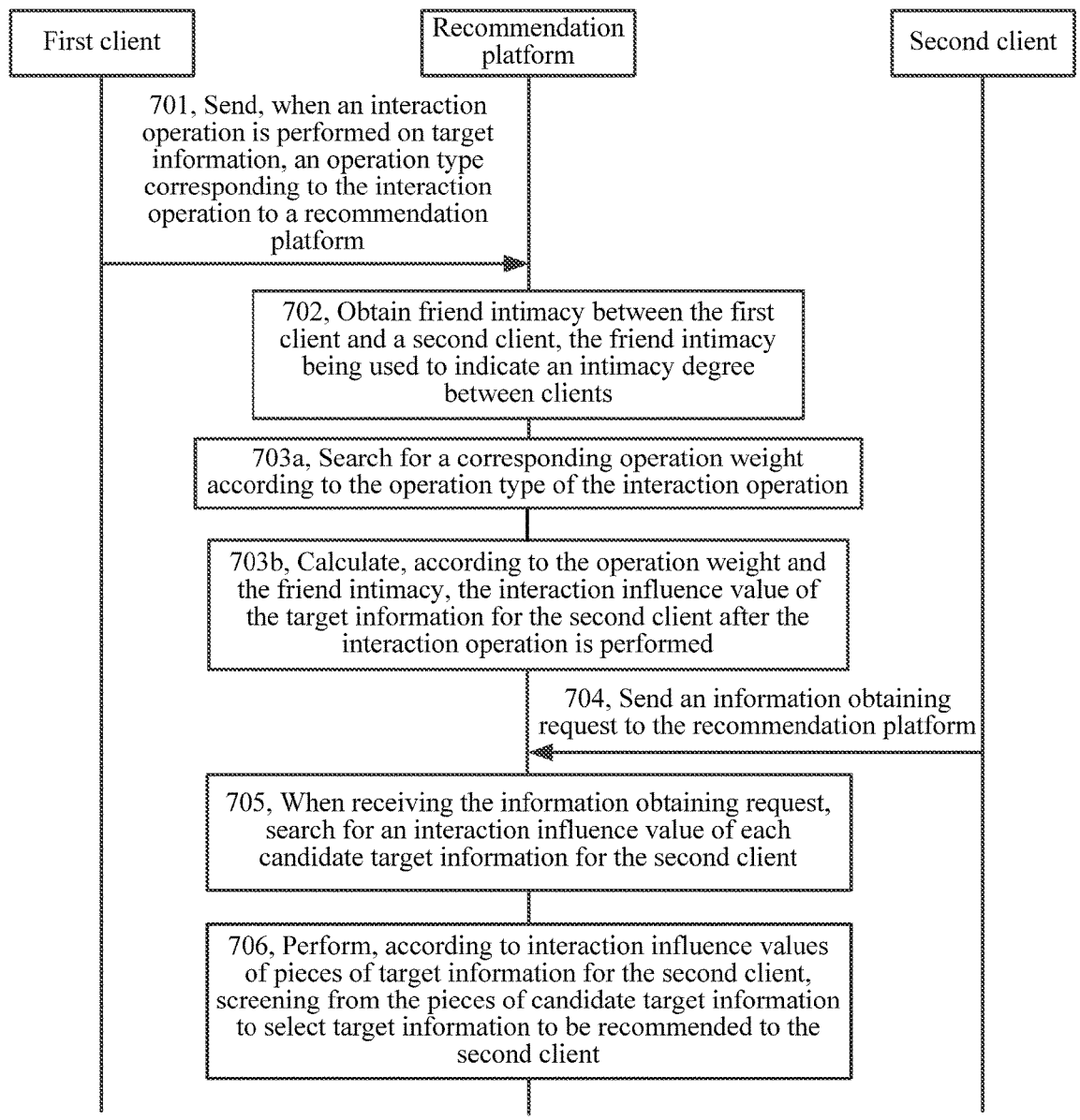
FIG. 7B is a logic flow for calculating an interaction influence value in an information recommendation method.

Additionally, interaction influence forces brought by different interaction operations performed by a same client on same target information are considered largely different. For example, an interaction influence force brought by commenting performed by a client on target information is far greater than an interaction influence force brought by marking the target information as interested. Therefore, to enable an interaction influence value obtained through calculation to more conform to an interaction operation of the user, the recommendation platform may calculate an interaction influence value of the target information according to an operation weight corresponding to an operation type and friend intimacy. In one example implementation, as shown in FIG. 7B, step 703 may include step 703a and step 703b.

Step 703a: The recommendation platform searches for a corresponding operation weight according to the operation type of the interaction operation.

A magnitude relationship between operation weights corresponding to different operation types may be: marking as uninterested <0<viewing≤marking as interested≤forwarding≤commenting.

In one implementation, a correspondence between an operation type and an operation weight pre-stored in the recommendation platform may be shown in Table 1.

It should be noted that, in this embodiment, only the foregoing operation type is described as an example, and classification of operation types is not limited.

Step 703b: The recommendation platform calculates, according to the operation weight and the friend intimacy, the interaction influence value of the target information for the second client after the interaction operation is performed.

The recommendation platform performs, according to the operation weight and the friend intimacy, calculation to obtain an interaction influence value of the interaction information for a friend client (the second client) of the first client when the first client performs an interaction operation on the target information. A method for calculating an interaction influence value may include performing weighting and averaging calculation according to the operation weight and the friend intimacy. Implementations for calculating an interaction influence value is not limited in the present invention.

For example, when User A (the first client) marks an advertisement i (target information) as interested, the recommendation platform finds that friend intimacy between User A and User B (a second client) is 0.2, and friend intimacy between User A and User C (another second client) is 0.5, and finds that an operation weight corresponding to "marking as interested" is 1. The recommendation platform performs calculation to obtain that when User A performs an interaction operation on the advertisement i, an interaction influence value of the advertisement i for User B is 0.2*1=0.2, and an interaction influence value of the advertisement i for User C is 0.5*1=0.5.

After performing calculation to obtain the interaction influence value of the target information for the second client, the recommendation platform may establish an index between the target information and the interaction influence value with descending interaction influence value by using an identifier of the second client as a keyword. An example of a descending index is shown in Table 3.

TABLE 3

| Client | Target information | Interaction influence value | Recent modification time |
|---|---|---|---|
| User A | advertisement i | 0.4 | 20150401120000 |
| User B | advertisement i | 0.2 | 20150401080000 |

Step 704: The second client sends a request to obtain information to the recommendation platform.

Similar to the first client, the second client may also be a microblog client, a blog client or a social application client. When the second client runs on a foreground of a terminal device or enables a particular function module, a request to obtain information is sent to the recommendation platform, where the request to obtain information carries an identifier of the second client, and is used to obtain recommended target information.

For example, an example in which the second client is WeChat presented by Tencent Technology (Shenzhen) Company Limited is used, and when a user enables a moments function of WeChat, the second WeChat client sends a request to obtain information to the recommendation platform.

Step 705: When receiving the request to obtain information, the recommendation platform searches for an interaction influence value of each candidate target information for the second client.

After receiving the request to obtain information sent by the second client, the recommendation platform searches a stored descending index between target information and an interaction influence value for an interaction influence value of each candidate target information for the second client. The candidate target information is target information initially selected by the recommendation platform by performing screening according to an interest point of the second client.

For example, when User A (the first client) marks the advertisement i (target information) as interested, an interaction influence value of the advertisement i for User B (the second client) is 0.2. When User B sends a request to obtain information to the recommendation platform, the recommendation platform may find from candidate advertisement i, advertisement j and advertisement k that an interaction influence value of the advertisement i for User B is 0.2.

Additionally, if the recommendation platform independently stores each operation type, when receiving a request to obtain information, the recommendation platform searches, for each candidate target information, for an interaction influence value of target information corresponding to each operation type for the second client.

For each candidate target information, the recommendation platform may store an interaction influence value of each operation type corresponding to the second client previously determined. When receiving a request to obtain information, for each target information, the recommendation platform may separately obtain an interaction influence value corresponding to each operation type.

Step 706: The recommendation platform performs, according to interaction influence values of pieces of target information for the second client, screening from the pieces of candidate target information to select target information to be recommended to the second client.

The recommendation platform may determine target information of pieces of candidate target information whose interaction influence value is greater than a preset threshold or whose interaction influence value is among a pre-determined number of top ranked interaction influence values as target information to be recommended to the second client, and send the target information to the second client.

For example, as shown in FIG. 4B, when the recommendation platform receives liking operations performed by friend clients B, C, and D of a client A on the target information 42, the recommendation platform may determine that the target information 42 is a target information of maximal interaction influence value among pieces of candidate target information. The recommendation platform then sends the target information 42 as recommended target information to the client A, and the client A displays the target information 42, and displays and indicates that the friend clients B, C, and D have performed the liking operations on the target information 42.

Additionally, if the recommendation platform independently stores each operation type, the recommendation platform may perform, according to the interaction influence value of the target information corresponding to the each operation type of pieces of target information for the second client, screening from pieces of candidate target information to select target information to be recommended to the second client.

Interaction influence forces brought by different interaction operations performed on same target information are largely different. In this case, the recommendation platform 140 may further obtain an operation weight corresponding to the each operation type; and perform, according to the operation weight corresponding to the each operation type, and an interaction influence value of the target information corresponding to the each operation type of the pieces of target information for the second client, screening from the pieces of candidate target information to select target information to be recommended to the second client.

The recommendation platform may pre-store an operation weight corresponding to each operation type. For each target information, after obtaining the interaction influence value of the target information corresponding to each operation type for the second client, the recommendation platform may obtain the operation weight corresponding to each operation type, and then perform weighted summation on the interaction influence value corresponding to each operation type, to obtain a final interaction influence value of the target information for the second client. For example, for target information A and a second client B, the recommendation platform performs search separately to find that an interaction influence value corresponding to an operation type 1 is 0.2, an interaction influence value corresponding to an operation type 2 is 0.4, an interaction influence value corresponding to an operation type 3 is 0.5, and the respective corresponding weights are a, b, and c. Thus a final interaction influence value of the target information A for the second client B is 0.2*a+0.4*b+0.5*c. Then, the recommendation platform 140 may perform, according to obtained final interaction influence values of pieces of target information for the second client, screening from pieces of candidate target information to select target information to be recommended to the second client.

It should be noted that, during actual screening, the recommendation platform may further comprehensively consider information such as an interest matching degree between the target information and the second client, a context matching degree of the target information and the interaction influence value of the target information for the second client, and perform screening from candidate target information to select target information to be recommended to the second client.

Figure 7C:
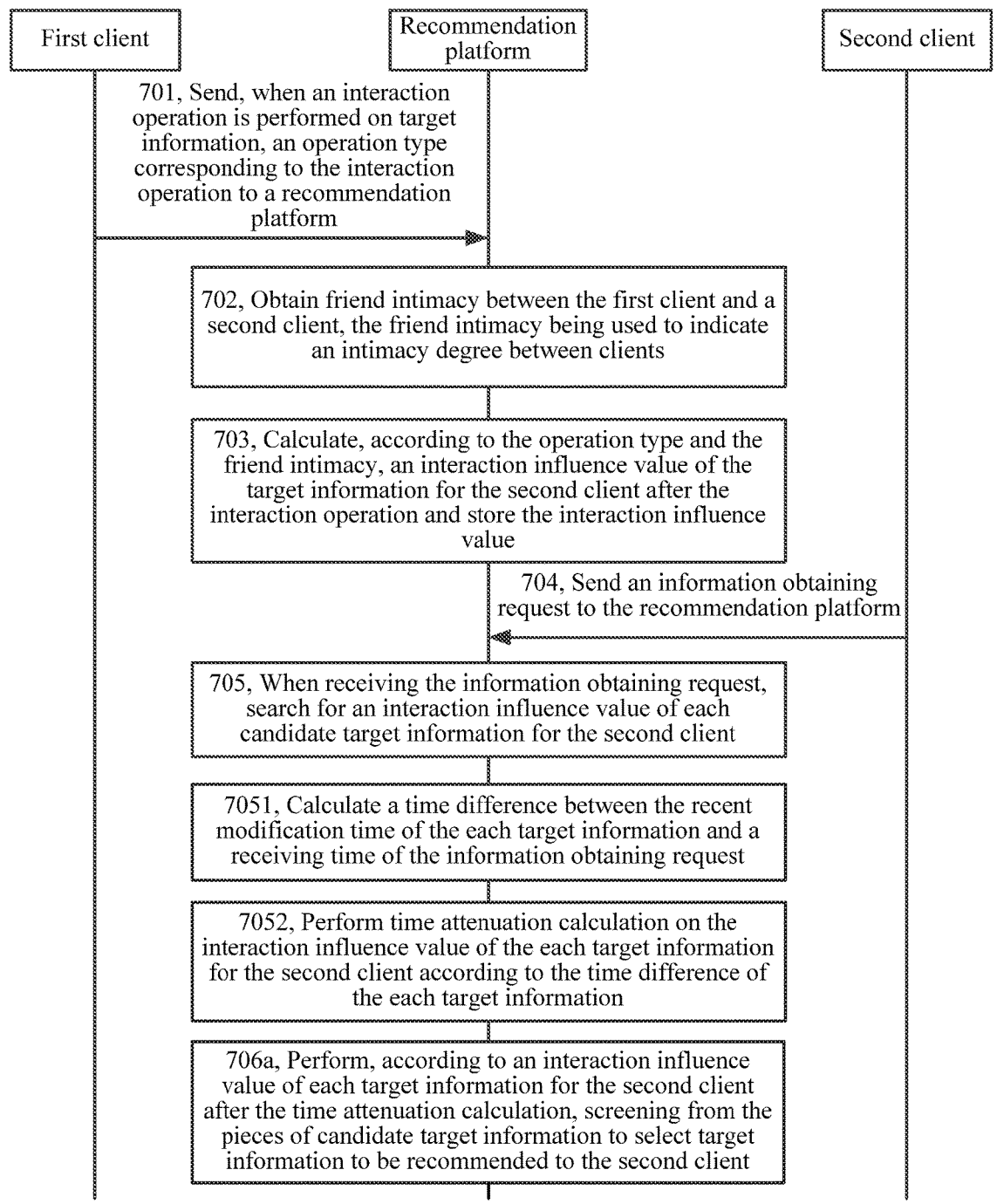
FIG. 7C is a logic flow for performing a time attenuation calculation process involved in an information recommendation method.

An interaction influence value of target information for a client may gradually decreases as time changes, and therefore the recommendation platform may further store a recent modification time of the interaction influence value of each target information for the second client, so as to subsequently perform time attenuation calculation on the interaction influence value. In one implementation, as shown in FIG. 7C, after step 705, step 7051 and step 7052 may be further included, and correspondingly, step 706 of FIG. 7A may be replaced with 706a.

Step 7051: The recommendation platform calculates a time difference between the recent modification time of the each target information and a receiving time of the request to obtain information.

When storing an interaction influence value of each target information for a client, the recommendation platform thus may further store a recent modification time of the interaction influence value.

When receiving a request to obtain information, the recommendation platform obtains a time difference between a receiving time of the request and a recent modification time corresponding to an interaction influence value of each target information for the second client.

For example, when the recommendation platform receives a request to obtain information sent by User B, if a receiving time of the request to obtain information is 12:00:00, Apr. 2, 2015, an interaction influence value of an advertisement i stored in the recommendation platform for User B is 0.2, and a recent modification time of the interaction influence value is 12:00:00, Apr. 1, 2015, the recommendation platform may perform calculation to obtain that the time difference is 24 hours.

Step 7052: The recommendation platform performs time attenuation calculation on the interaction influence value of the each target information for the second client according to the time difference of the each target information.

The recommendation platform performs time attenuation calculation on an interaction influence value of each target information for the second client according to a time difference of each target information obtained through calculation, to obtain a real-time interaction influence value of each target information for the second client. A time attenuation function used for the time attenuation calculation is not limited in the present invention.

For example, the recommendation platform obtains that an interaction influence value of an advertisement i for User B is 0.2, and a time difference is 24 hours, so as to obtain that a real-time interaction influence value after time attenuation calculation is less than 0.2 (e.g., 0.05).

Step 706a: The recommendation platform performs, according to an interaction influence value of each target information for the second client after the time attenuation calculation, screening from the pieces of candidate target information to select target information to be recommended to the second client.

Similar to step 706, the recommendation platform performs, according to an interaction influence value after time attenuation calculation, screening to select target information to be recommended to the second client.

Figure 7D:
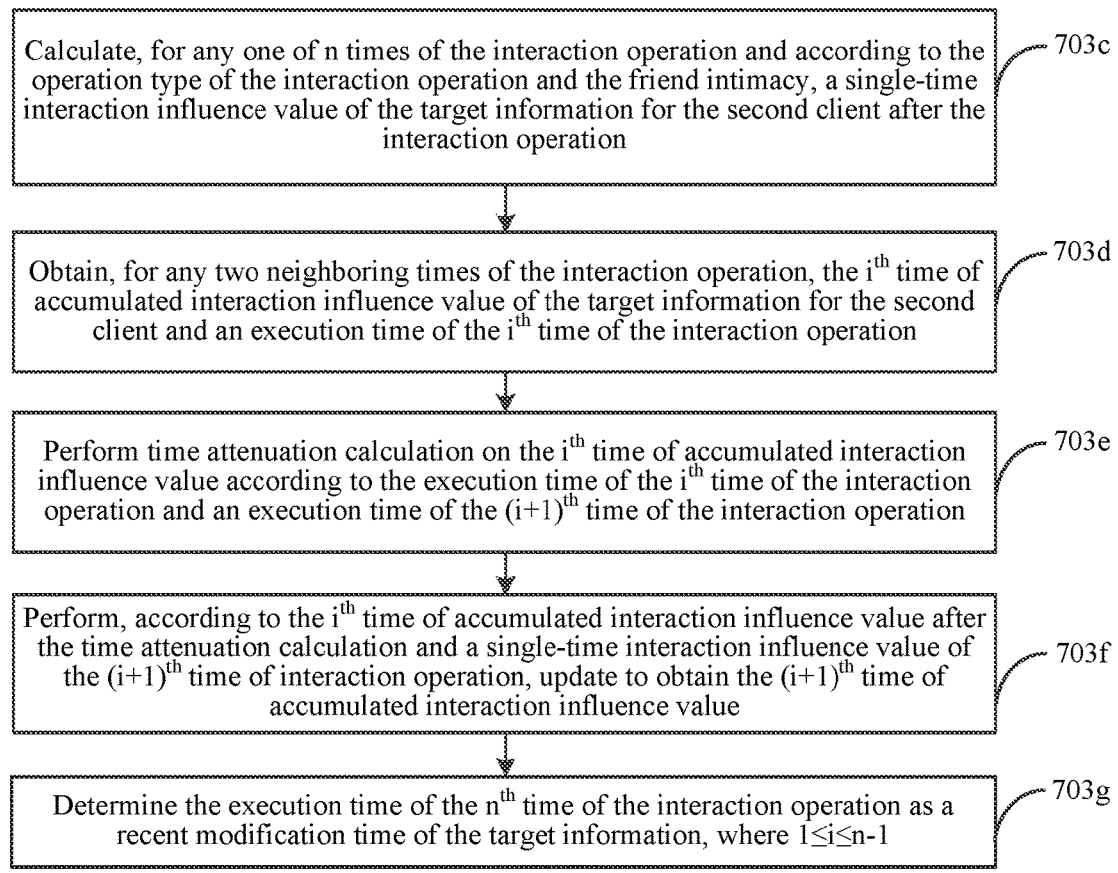
FIG. 7D is a logic flow for performing an interaction influence value update process involved in an information recommendation method.

A same piece of target information may correspond to n interaction operations successively performed, and the n interaction operations may be from one or more first clients, and therefore the recommendation platform 140 needs to accumulate interaction influence values corresponding to multiple of interaction operation, and perform update in real time, thereby ensuring accuracy of the interaction influence value. In one implementation, as shown in FIG. 7D, step 703 may include the following steps:

Step 703c: The recommendation platform calculates, for any one of the n interaction operations and according to the operation type of the interaction operation and the friend intimacy, a single-time interaction influence value of the target information for the second client after the interaction operation.

An implementation manner of this step is similar to that of step 703a and step 703b, and details are not described herein again.

Step 703d: The recommendation platform obtains, for any two neighboring times of the interaction operation, the ith accumulated interaction influence value of the target information for the second client and an execution time of the ith interaction operation.

For convenience of understanding, an example in which n=2 and i=1 is used in the example below.

The recommendation platform receives an interaction operation performed by the client A (a first client) on an advertisement k at 12:00:00, Apr. 1, 2015 (an execution time of the first-time interaction operation), and stores a first interaction influence value of the advertisement k for a client C (the second client) (because an interaction operation performed by another first client on the advertisement k is not received previously, the first interaction influence value is the first-time accumulated interaction influence value). At 12:00:00, Apr. 2, 2015 (an execution time of the second-time interaction operation), the recommendation platform receives an interaction operation performed by the client B (another first client) on the advertisement k, and the client B and the client C have a friend relationship. A time interval exists between the execution time of the first-time interaction operation and the execution time of the second-time interaction operation, and therefore when calculating an accumulated interaction influence value, the recommendation platform may not simply add the first interaction influence value and the second interaction influence value, but may first perform time attenuation calculation on the first interaction influence value. Correspondingly, the recommendation platform obtains that the execution time of the first-time interaction operation is 12:00:00, Apr. 1, 2015.

Step 703e: The recommendation platform performs time attenuation calculation on the ith accumulated interaction influence value according to the execution time of the ith interaction operation and an execution time of the (i+1)th interaction operation.

The recommendation platform further obtains the execution time of the second-time interaction operation (12:00:00, Apr. 2, 2015), and performs calculation to obtain that a time difference between the execution time of the first-time interaction operation and the execution time of the second-time interaction operation is 24 hours. The recommendation platform performs time attenuation calculation on the stored first interaction influence value according to the time difference, and obtains that the first interaction influence value after the time attenuation calculation is, for example, 0.05.

Step 703f: The recommendation platform performs, according to the ith attenuated accumulated interaction influence value after the time attenuation calculation and a single-time interaction influence value of the (i+1)th interaction operation, update to obtain the (i+1)th accumulated interaction influence value.

After performing time attenuation calculation on the first interaction influence value, the recommendation platform may perform update according to the first interaction influence value after the time attenuation calculation and the initial second interaction influence value to obtain the second-time accumulated interaction influence value.

For example, if the first interaction influence value after time attenuation calculation is 0.05, and the second interaction influence value is 0.8, it is obtained through update that the second-time accumulated interaction influence value is 0.05+0.8=0.85.

It should be noted that, in one implementation, the recommendation platform may further perform weighting and averaging calculation according to the ith attenuated accumulated interaction influence value after time attenuation calculation and the (i+1)th interaction influence value, thereby obtaining the (i+1)th accumulated interaction influence value. This is not limited in the present invention.

Step 703g: The recommendation platform determines the execution time of the nth interaction operation as a recent modification time of the target information, where $1 \le i \le n-1$.

After updating the second-time accumulated interaction influence value, the recommendation platform further needs to determine the execution time of the second-time interaction operation, that is, 12:00:00, Apr. 2, 2015 as the recent modification time of the target information.

To sum up, in the information recommendation method provided in this embodiment, when a client performs an interaction operation on target information, an interaction influence value of the target information for each friend client is calculated in real time, so that when receiving a request to obtain information, a recommendation platform does not need to calculate an influence force of each friend client for candidate target information, so as to resolve a problem that because calculation complexity is quite high, after sending the request to obtain information to a server, a user can obtain a feedback of the server only after a relatively long time, thereby achieving effects of reducing the calculation complexity and improving a server feedback speed.

In some implementation above, the recommendation platform performs time attenuation calculation on an interaction influence value according to an time difference between a recent modification time of the interaction influence value and a receiving time of a request to obtain information, so that the interaction influence value obtained through calculation is more accurate, thereby improving a click-through rate of a user for recommended target information.

In some implementation above, when receiving interaction operations performed by n first clients successively on same target information, the recommendation platform performs time attenuation calculation on a historical interaction influence value, and performs update with reference to an interaction influence value corresponding to the last-time interaction operation, to obtain a final interaction influence value, so that the interaction influence value obtained through calculation is more accurate, thereby improving a click-through rate of a user for recommended target information.

In some implementation above, the recommendation platform searches for corresponding operation weights according to different operation types, and calculates an interaction influence value of target information for the second client according to the operation weights and friend intimacy, so that the interaction influence value obtained through calculation more conforms to an actual situation, thereby improving a click-through rate of a user for recommended target information.

In some implementation above, the recommendation platform further integrates a negative interaction operation such as marking as uninterested into interaction influence value calculation, so that an interaction influence value obtained through calculation more conforms to an interaction operation of a friend of a user, thereby improving a click-through rate of the user for recommended target information.

Figure 8A:
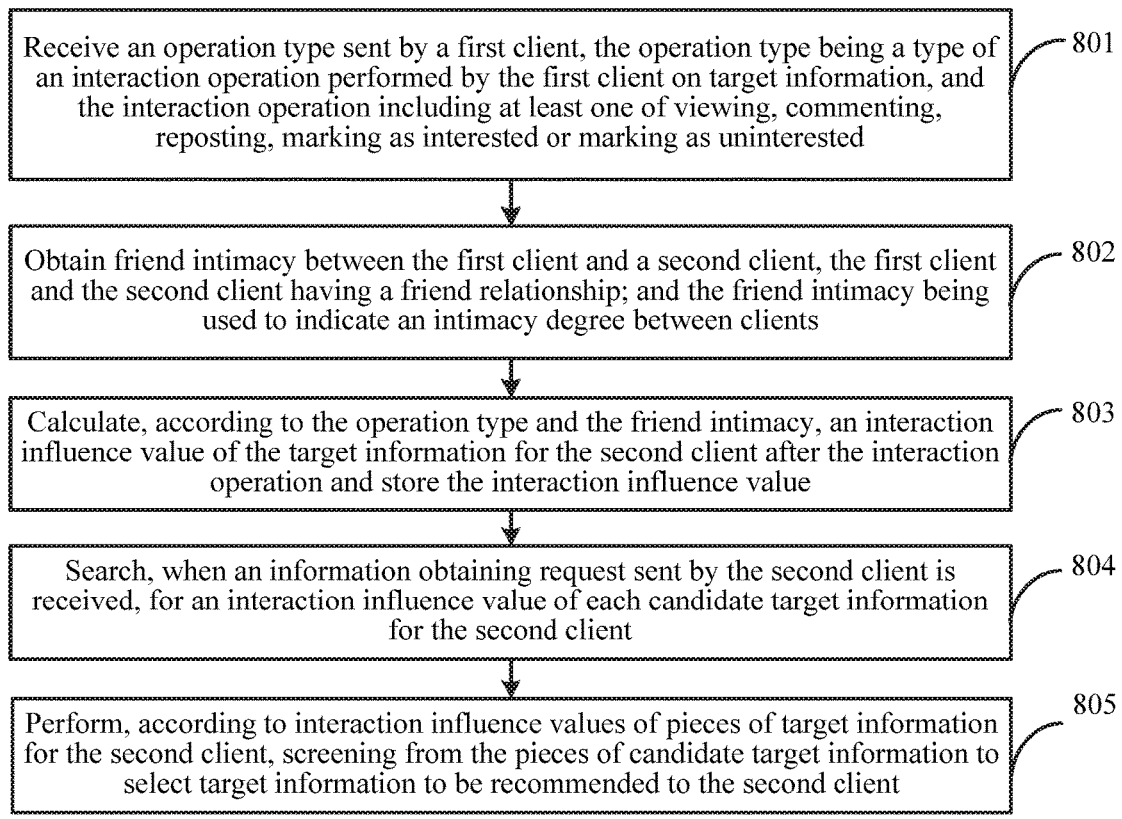
FIG. 8A is a logic flow of an information recommendation method.

It should be noted that, in the foregoing implementations, steps 702, 703, 705, 706, 7051, 7052, 706a, 703a, 703b, 703c, 703d, 703e, 703f and 703g, by itself, or correspondingly, may be implemented to become an information recommendation method on a recommendation platform side. As shown in FIG. 8A, the method includes:

Step 801: Receive an operation type sent by a first client, the operation type being a type of an interaction operation performed by the first client on target information, and the interaction operation including at least one of viewing, commenting, forwarding, marking as interested or marking as uninterested.

Step 802: Obtain friend intimacy between the first client and a second client, the first client and the second client having a friend relationship; and the friend intimacy being used to indicate an intimacy degree between clients.

Step 803: Calculate, according to the operation type and the friend intimacy, an interaction influence value of the target information for the second client after the interaction operation and store the interaction influence value.

Optionally, processing of step 803 may be: determining, according to the friend intimacy, an interaction influence value of the target information corresponding to the operation type for the second client after the interaction operation, and storing the interaction influence value.

Step 804: Search, when a request to obtain information sent by the second client is received, for an interaction influence value of each candidate target information for the second client.

Optionally, the interaction influence value of the target information for the second client may include: an interaction influence value of target information corresponding to each operation type for the second client.

Step 805: Perform, according to interaction influence values of pieces of target information for the second client, screening from the pieces of candidate target information to select target information to be recommended to the second client.

Optionally, a processing process of step 805 may be: obtaining an operation weight corresponding to the each operation type; and performing, according to the operation weight corresponding to the each operation type, and an interaction influence value of the target information corresponding to the each operation type of the pieces of target information for the second client, screening from the pieces of candidate target information to select target information to be recommended to the second client.

Figure 8B:
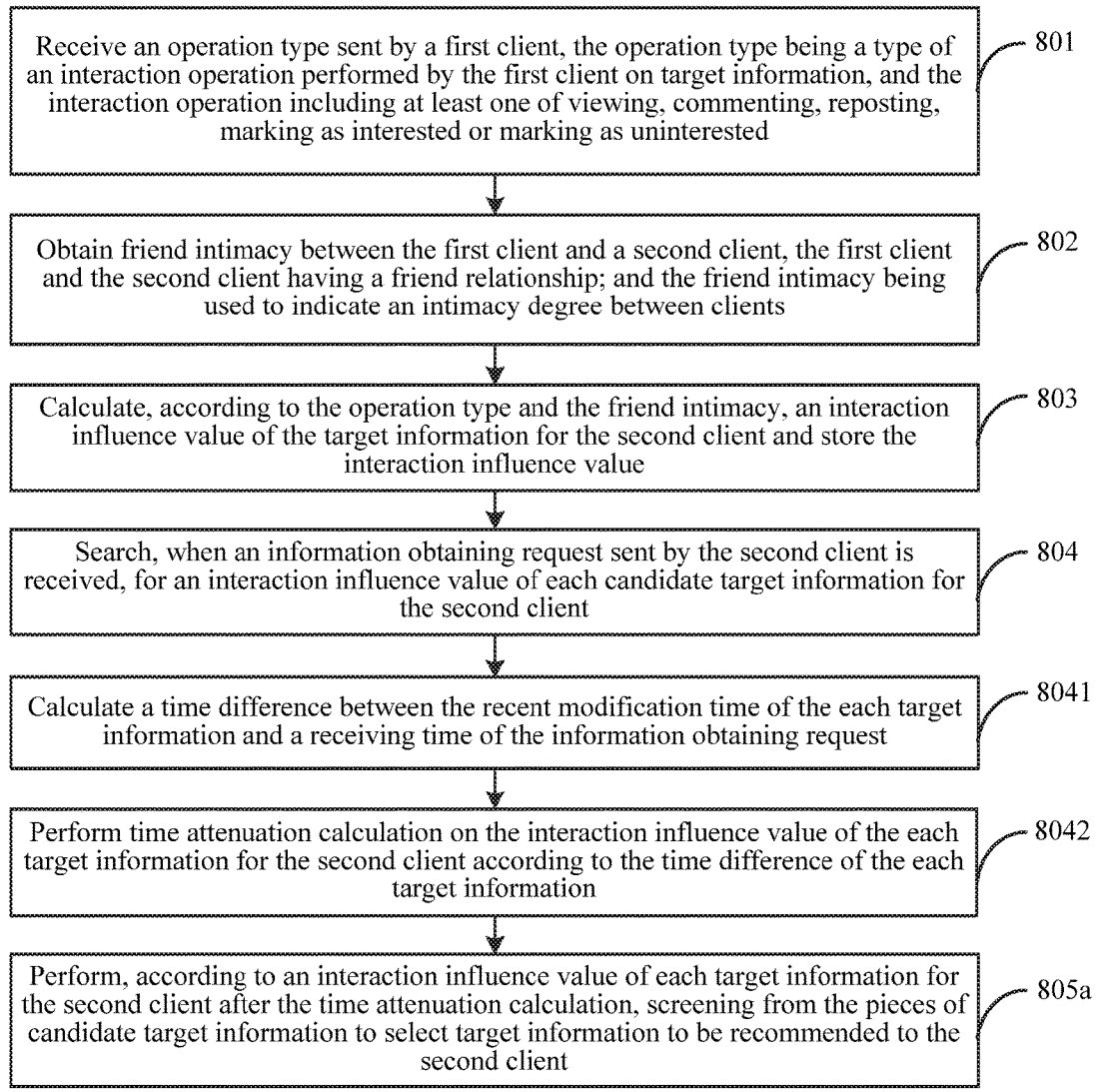
FIG. 8B is a logic flow for performing a time attenuation calculation process involved in an information recommendation method.

Optionally, the recommendation platform further stores a recent modification time of the interaction influence value of the each target information for the second client, and as shown in FIG. 8B, after step 804, the method further includes:

Step 8041: Calculate a time difference between the recent modification time of the each target information and a receiving time of the request to obtain information.

Step 8042: Perform time attenuation calculation on the interaction influence value of the each target information for the second client according to the time difference of the each target information.

Correspondingly, step 805 may be replaced with step 805a:

Step 805a: Perform, according to an interaction influence value of each target information for the second client after the time attenuation calculation, screening from the pieces of candidate target information to select target information to be recommended to the second client.

Figure 8C:
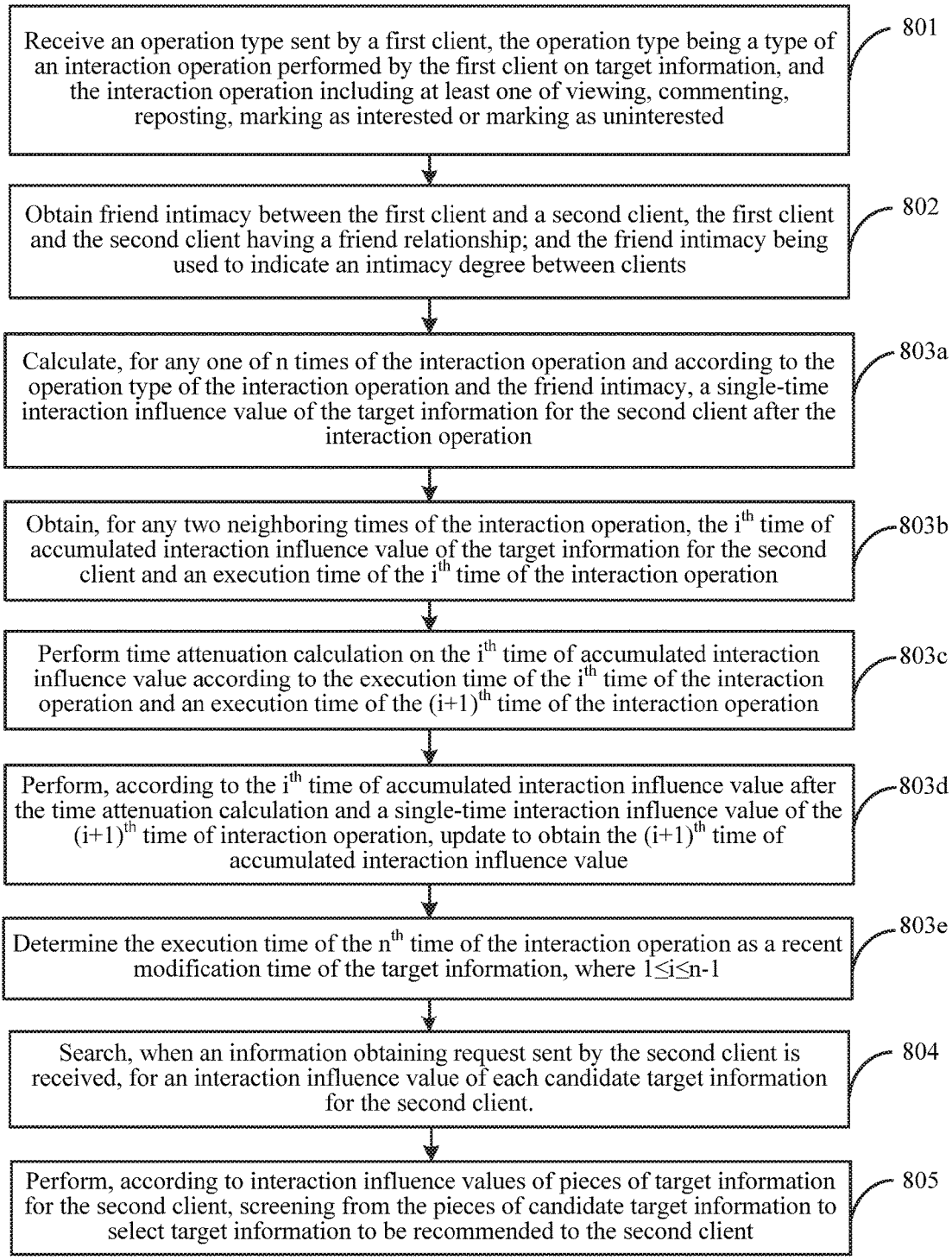
FIG. 8C is a logic flow for performing an interaction influence value update process involved in an information recommendation method.

Optionally, when a same piece of target information corresponds to n interaction operations performed successively, where $n \ge 2$, as shown in FIG. 8C, step 803 includes:

Step 803a: Calculate, for any one of the n the interaction operations and according to the operation type of the interaction operation and the friend intimacy, a single-time interaction influence value of the target information for the second client after the interaction operation.

Step 803b: Obtain, for any two neighboring times of the interaction operation, the ith accumulated interaction influence value of the target information for the second client and an execution time of the ith interaction operation.

Step 803c: Perform time attenuation calculation on the ith accumulated interaction influence value according to the execution time of the ith interaction operation and an execution time of the (i+1)th interaction operation.

Step 803d: Perform, according to the ith attenuated accumulated interaction influence value after the time attenuation calculation and a single-time interaction influence value of the (i+1)th interaction operation, update to obtain the (i+1)th accumulated interaction influence value.

Step 803e: Determine the execution time of the nth t interaction operation as a recent modification time of the target information, where $1 \leq i \leq n-1$.

Figure 8D:
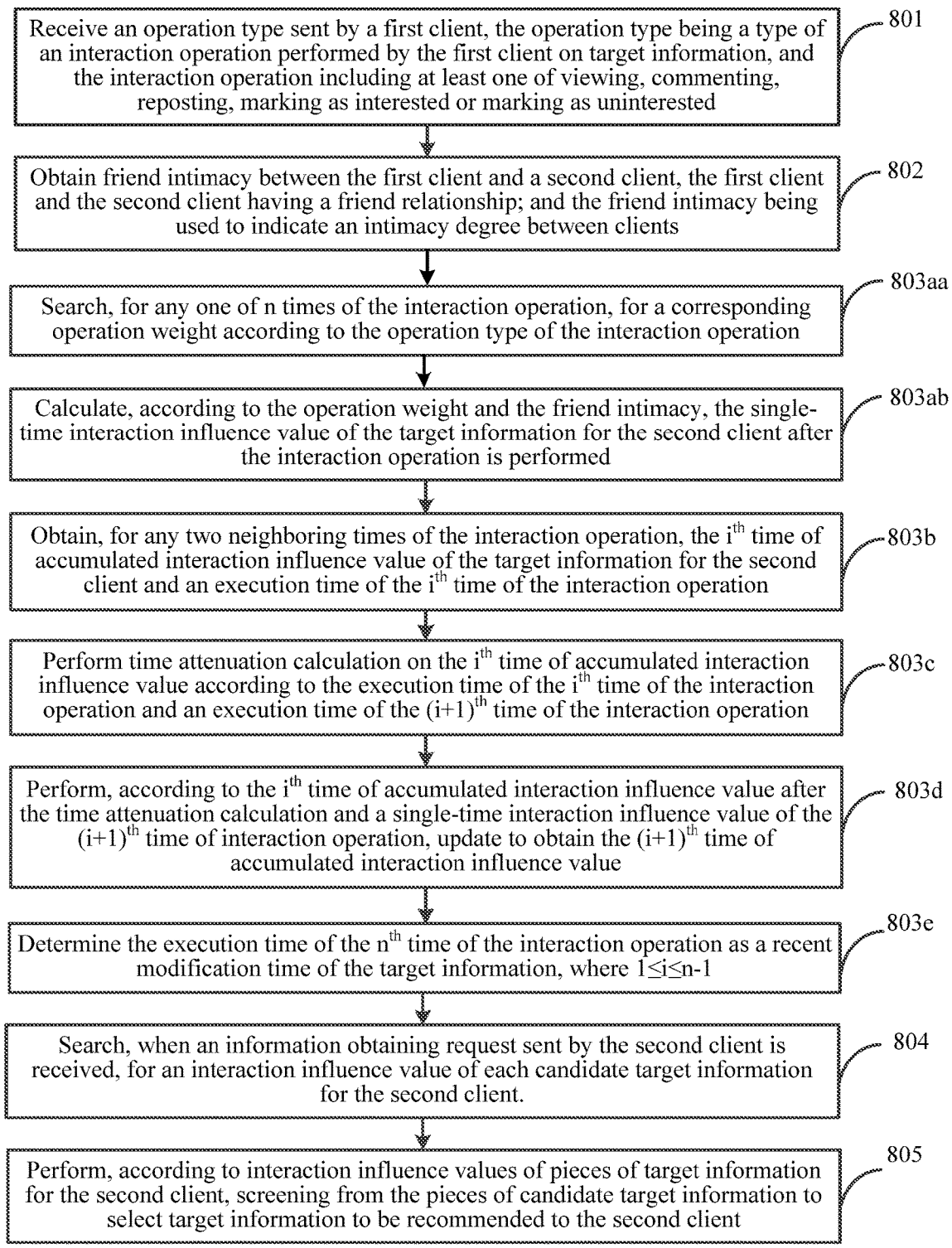
FIG. 8D is a logic flow for performing an interaction influence value calculation process involved in an information recommendation method.

Optionally, as shown in FIG. 8D, step 803a includes:

Step 803aa: Search, for any one of the n interaction operations, for a corresponding operation weight according to the operation type of the interaction operation.

Step 803ab: Calculate, according to the operation weight and the friend intimacy, the single-time interaction influence value of the target information for the second client after the interaction operation is performed.

It should be understood that, a singular form "one" ("a", "an", "the") used herein, unless an exceptional case that is clearly supported in the context, aims to also include a plural form. It should also be understood that, the "and/or" used herein indicates any and all possible combinations including one or more than one associated listed items.

The sequence numbers of the preceding embodiments of the present invention are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

What is described above is merely an example of the embodiments of the present invention, and is not intended to limit the present disclosure. Any modifications, equivalent variations, and improvements made in accordance with the spirits and principles of the present disclosure shall fall within the protection scope of the present disclosure.

What is claimed is:

1. A method for real-time information processing in an information recommendation platform, the platform including at least one processor and a memory in communication with the at least one processor, the memory having program instructions stored therein, wherein the at least one processor, when executing the program instructions, performs the method comprising:

receiving, in real-time, from a first client running on a first terminal device, a client identifier of the first client and an information identifier of a target information when a current interaction operation is performed by the first client on the target information;

receiving from the first client in real-time a current operation type corresponding to the current interaction operation; and upon receiving the client identifier of the first client and the information identifier of the target information:

recording a current interaction time for the current interaction operation;

obtaining a friend client identifier from a friend database for a second client of a second terminal device;

obtaining a friend intimacy of the second client with the first client from the friend database; and calculating a current interaction influence value of the target information on the second client based on the current operation type corresponding to the current interaction operation and the friend intimacy of the second client with the first client.

2. The method of claim 1, wherein a recent interaction influence value of the target information on the second client and a corresponding recent interaction time was recorded in the friend database, and the method further comprising, upon calculating the current interaction influence value:

calculating an updated interaction influence value of the target information on the second client based on the current interaction influence value, the recent interaction influence value, and a difference between the current interaction time and the recent interaction time; and recording, in place of the recent interaction influence value and as a new recent interaction influence value of the target information on the second client, the updated interaction influence value in the friend database.

3. The method of claim 2, further comprising:

receiving from the second client of the second terminal device a request for information;

determining a collection of pieces of candidate information; and selecting from the collection of pieces of candidate information a recommended piece of information based on recent interaction influence value of the pieces of candidate information in the friend database on the second client.

4. The method of claim 2, wherein the recent interaction influence value comprises an accumulated interaction influence value on the second client from previous operation interactions on the target information by a plurality of friend clients of the second client.

5. The method of claim 2, wherein calculating the updated interaction influence value of the target information on the second client comprises calculating the updated interaction influence value by combining the current interaction influence value and the recent interaction influence value with the recent interaction influence value time-attenuated by a difference between the current interaction time and the recent interaction time.

6. The method of claim 1, wherein the current operation type corresponding to the current interaction operation comprises at least one of viewing, commenting, forwarding, marking as interested, and marking as uninterested.

7. The method of claim 6, wherein calculating the current interaction influence value of the target information on the second client comprises weighing the current operation type corresponding to the current interaction on the interaction influence value of the target information on the second client according to: marking as uninterested $<0<$viewing$\leq$marking as interested$\leq$forwarding$\leq$commenting.

8. The method of claim 1, wherein the friend database further comprises:

a first recent interaction influence value of the target information on the second client and a corresponding first recent interaction time recorded in the friend database under the target information, the second client, and the current operation type; and a second recent interaction influence value of the target information on the second client and a corresponding second recent interaction time recorded in the friend database under the target information, the second client, and a second operation type; and the method further comprising:

calculating an updated interaction influence value of the target information on the second client based on the current interaction influence value, the first recent interaction influence value, and a difference between the current interaction time and the first recent interaction time;

recording, in place of the first recent interaction influence value and as a new first recent interaction influence value of the target information on the second client, the updated interaction influence value in the friend database; and calculating a combined interaction influence value of the target information on the second client based on an average or sum of the first recent interaction influence value and the second recent interaction influence value weighed according to the current operation type and second operation type.

9. The method of claim 8, further comprising:
before calculating the combined interaction influence value:
  receiving from the second client of the second terminal device a request for information; and
  determining a collection of pieces of candidate information including the target information; and
after calculating the combined interaction influence value:
  selecting from the collection of pieces of candidate information a recommended piece of information based on combined interaction influence value of the pieces of candidate information on the second client.

10. A real-time information processing and recommendation system, comprising:
  at least one processor;
  a memory in communication with the at least one processor, the memory having program instructions stored therein; and
  a friend database in communication with the at least one processor, where the at least one processor, when executing the instructions, is configured to:
  receive, in real-time, from a first client running on a first terminal device, a client identifier of the first client and an information identifier of a target information when a current interaction operation is performed by the first client on the target information;
  receive from the first client in real-time a current operation type corresponding to the current interaction operation; and
  upon receiving the client identifier of the first client and the information identifier of the target information:
    record a current interaction time for the current interaction operation;
    obtain a friend client identifier from a friend database for a second client of a second terminal device;
    obtain a friend intimacy of the second client with the first client from the friend database; and
    calculate a current interaction influence value of the target information on the second client based on the current operation type corresponding to the current interaction operation and the friend intimacy of the second client with the first client.

11. The real-time information processing and recommendation system of claim 10, wherein a recent interaction influence value of the target information on the second client and a corresponding recent interaction time was recorded in the friend database, and wherein the at least one processor, when executing the instructions, upon calculating the current interaction influence value, is further configured to:
  calculate an updated interaction influence value of the target information on the second client based on the current interaction influence value, the recent interaction influence value, and a difference between the current interaction time and the recent interaction time; and
  record, in place of the recent interaction influence value and as a new recent interaction influence value of the target information on the second client, the updated interaction influence value in the friend database.

12. The real-time information processing and recommendation system of claim 11, wherein the at least one processor, when executing the instructions, is further configured to:
  receive from the second client of the second terminal device a request for information;
  determine a collection of pieces of candidate information; and
  select from the collection of pieces of candidate information a recommended piece of information based on recent interaction influence value of the pieces of candidate information in the friend database on the second client.

13. The real-time information processing and recommendation system of claim 11, wherein the recent interaction influence value comprises an accumulated interaction influence value on the second client from previous operation interactions on the target information by a plurality of friend clients of the second client.

14. The real-time information processing and recommendation system of claim 11, wherein to calculate the updated interaction influence value of the target information on the second client, the at least one processor, when executing the instructions, is configured to calculate the updated interaction influence value by combining the current interaction influence value and the recent interaction influence value with the recent interaction influence value time-attenuated by a difference between the current interaction time and the recent interaction time.

15. The real-time information processing and recommendation system of claim 10, wherein the current operation type corresponding to the current interaction operation comprises at least one of viewing, commenting, forwarding, marking as interested, and marking as uninterested.

16. The real-time information processing and recommendation system of claim 15, wherein to calculate the current interaction influence value of the target information on the second client, the at least one processor, when executing the instructions, is configured to weigh the current operation type corresponding to the current interaction on the interaction influence value of the target information on the second client according to: marking as uninterested $<0<$viewing$\leq$marking as interested$\leq$forwarding$\leq$commenting.

17. The real-time information processing and recommendation system of claim 10,
wherein the friend database further comprises:
  a first recent interaction influence value of the target information on the second client and a corresponding first recent interaction time recorded in the friend database under the target information, the second client, and the current operation type; and a second recent interaction influence value of the target information on the second client and a corresponding second recent interaction time recorded in the friend database under the target information, the second client, and a second operation type; and wherein the at least one processor, when executing the instructions, is further configured to:

calculate an updated interaction influence value of the target information on the second client based on the current interaction influence value, the first recent interaction influence value, and a difference between the current interaction time and the first recent interaction time;

record, in place of the first recent interaction influence value and as a new first recent interaction influence value of the target information on the second client, the updated interaction influence value in the friend database; and calculate a combined interaction influence value of the target information on the second client based on an average or sum of the first recent interaction influence value and the second recent interaction influence value weighed according to the current operation type and second operation type.

18. The real-time information processing and recommendation system of claim 17, the at least one processor, when executing the instructions, is further configured to:

before calculating the combined interaction influence value:

receive from the second client of the second terminal device a request for information; and determine a collection of pieces of candidate information including the target information; and after calculating the combined interaction influence value:

select from the collection of pieces of candidate information a recommended piece of information based on combined interaction influence value of the pieces of candidate information on the second client.

19. A real-time information processing and recommendation system, comprising;

a real-time information processing and information recommendation platform the platform including at least one processor and a memory in communication with the at least one processor, the memory having program instructions stored therein;

a first terminal device in communication with the platform and running a first client of the platform with an client identifier, the first terminal device including at least one processor and a memory in communication with the at least one processor, the memory having program instructions stored therein;

wherein the at least one processor of the first terminal device, when executing the program instructions stored in the memory of the first terminal device, configure the first terminal device to:

send, in real time, a client identifier of the first client and an information identifier of a target information when a current interaction operation is performed by the first client on the target information;

send a current operation type corresponding to the current interaction operation; and send, in real time, a current interaction time for the current interaction operation;

wherein the at least one processor of the information recommendation platform, when executing the program instructions stored in the memory of the information recommendation platform, configure the platform to:

receive, in real-time, the client identifier of the first client and the information identifier of the target information;

receive, in real-time, the current operation type corresponding to the current interaction operation; and upon receiving the client identifier of the first client, the information identifier of the target information, and the current interaction time for the current interaction operation:

record the current interaction time for the current interaction operation;

determine that a second client running on a second terminal device is a friend of the first client based on a friend database;

obtain a friend intimacy of the second client with the first client from the friend database; and calculate a current interaction influence value of the target information on the second client based on the current operation type corresponding to the current interaction operation and the friend intimacy of the second client with the first client.

20. The real-time information processing and recommendation system of claim 19, wherein a recent interaction influence value of the target information on the second client and a corresponding recent interaction time was recorded in the friend database, and wherein the platform, upon calculating the current interaction influence value, is further configured to:

calculate an updated interaction influence value of the target information on the second client based on the current interaction influence value, the recent interaction influence value, and a difference between the current interaction time and the recent interaction time; and record, in place of the recent interaction influence value and as a new recent interaction influence value of the target information on the second client, the updated interaction influence value in the friend database.

* * * * *